US012338789B2

United States Patent
Wijning et al.

(10) Patent No.: US 12,338,789 B2
(45) Date of Patent: Jun. 24, 2025

(54) INSTALLATION OF A ROTOR BLADE IN HORIZONTAL ORIENTATION TO THE HUB OF A HORIZONTAL AXIS OFFSHORE WIND TURBINE THAT IS LOCATED OFFSHORE

(71) Applicant: Itrec B.V., Schiedam (NL)

(72) Inventors: Diederick Bernardus Wijning, Schiedam (NL); David Roodenburg, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 18/579,124

(22) PCT Filed: Jul. 8, 2022

(86) PCT No.: PCT/EP2022/069151
§ 371 (c)(1),
(2) Date: Jan. 12, 2024

(87) PCT Pub. No.: WO2023/285317
PCT Pub. Date: Jan. 19, 2023

(65) Prior Publication Data
US 2024/0318633 A1    Sep. 26, 2024

(30) Foreign Application Priority Data

Jul. 15, 2021  (NL) .................................... 2028730
Jan. 21, 2022  (NL) .................................... 2030641

(51) Int. Cl.
*F03D 13/10*    (2016.01)
*F03D 13/25*    (2016.01)
(52) U.S. Cl.
CPC ......... *F03D 13/104* (2023.08); *F03D 13/126* (2023.08); *F03D 13/25* (2016.05); *F05B 2230/61* (2013.01); *F05B 2230/6102* (2013.01)

(58) Field of Classification Search
CPC ...... F03D 13/104; F03D 13/126; F03D 13/25; F03D 13/10; F05B 2230/61; F05B 2230/6102; Y02E 10/72; Y02E 10/727
See application file for complete search history.

(56) References Cited

U.S. PATENT DOCUMENTS

2023/0228246 A1*  7/2023  Geene ..................... F03D 13/25
                                                    29/889.21

FOREIGN PATENT DOCUMENTS

EP    2 538 073 A2    12/2012
EP    3 507 490 A1    7/2019
(Continued)

OTHER PUBLICATIONS

Dutch Search Report issued in priority application No. 2028730 dated Mar. 18, 2022.
(Continued)

*Primary Examiner* — Joseph Ortega
(74) *Attorney, Agent, or Firm* — Birch, Stewart, Kolasch & Birch, LLP

(57) ABSTRACT

In the installation of a rotor blade in horizontal orientation to the hub of a horizontal axis offshore wind turbine, use is made of a blade motion synchronization and positioning device, which comprises a wind turbine coupler, a blade coupler, a motion arm between the wind turbine coupler and the blade coupler, and a controllable motion arm actuator assembly. The method includes bringing and maintaining the blade coupler in a motion compensated receiving position, wherein the arm is operated to compensate for sea state and/or wind induced tower top motion. In receiving position, the coupler is coupled to the blade that is suspended from a crane. The actuator assembly is then operated to gradually bring, and then maintain, the coupled blade in a horizontal motion that is synchronized with tower top motion, and to displace the coupled blade root into a pre-mounting position.

(Continued)

Figure 1:
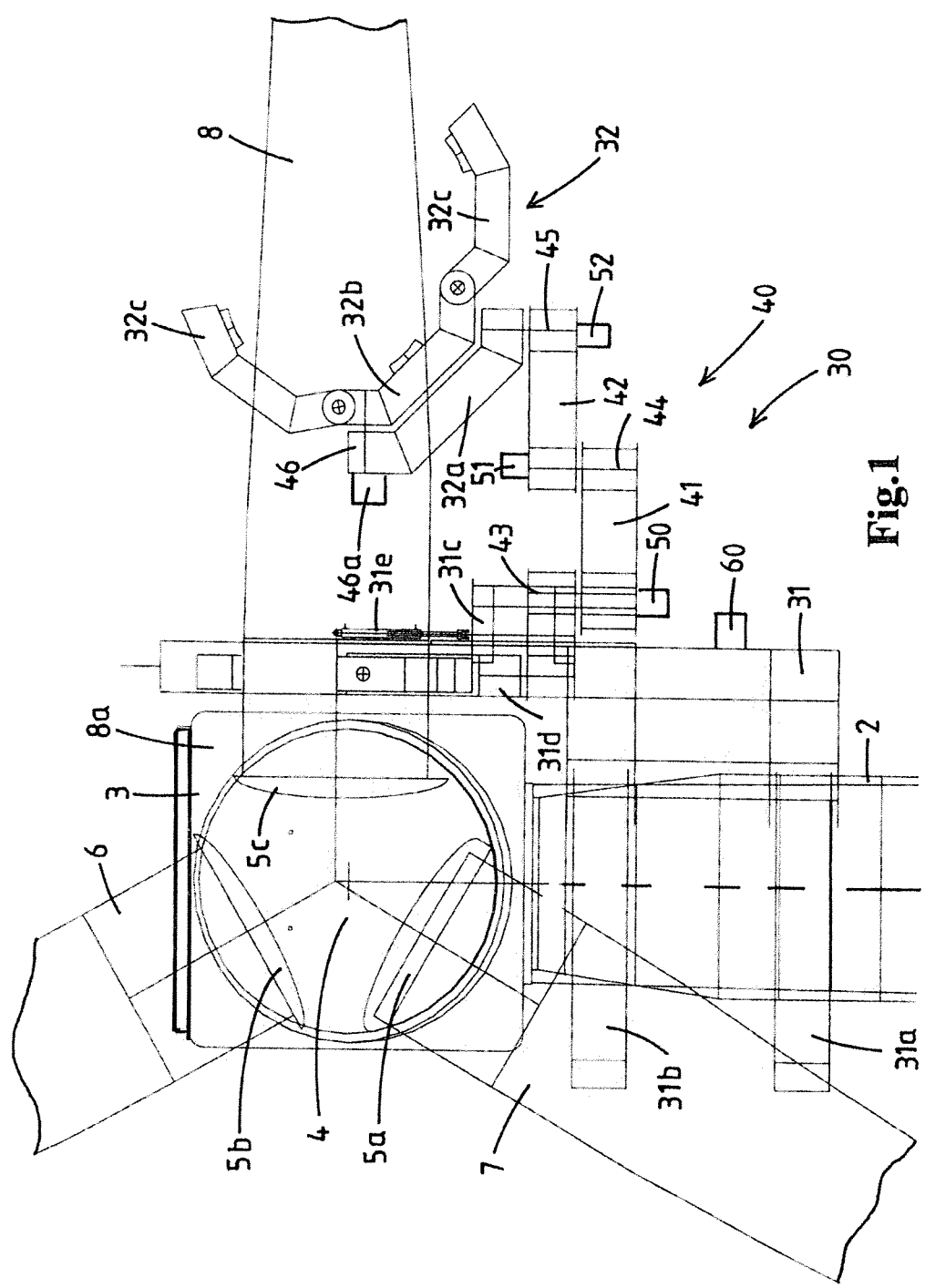

Then a mounting motion is performed wherein the blade root is moved into a mounting position and the blade root is fastened to mounting structure by fasteners.

26 Claims, 17 Drawing Sheets

(56) References Cited

FOREIGN PATENT DOCUMENTS

| EP | 3 792 211 A1 | 3/2021 |
|----|---|---|
| WO | WO 2017/108053 A1 | 6/2017 |
| WO | WO 2018/041663 A1 | 3/2018 |
| WO | WO 2018/106105 A1 | 6/2018 |
| WO | WO 2018/162101 A1 | 9/2018 |
| WO | WO 2018/199743 A2 | 11/2018 |
| WO | WO 2019/156556 A1 | 8/2019 |
| WO | WO 2021/104677 A1 | 6/2021 |

OTHER PUBLICATIONS

International Search Report for PCT/EP2022/069151 (PCT/ISA/210) mailed on Oct. 10, 2022.
Patel et al., "Effective Optimal Vibration Control Methods for Offshore Wind Turbines: Economic and Engineering Perspectives", Jan. 2019, hal-01970664, total 9 pages.
Verma et al., "Effects of Wind-Wave Misalignment on a Wind Turbine Blade Mating Process: Impact Velocities, Blade Root Damages and Structural Safety Assessment", Journal of Marine Science and Application, Sep. 2020, vol. 19, pp. 218-233, https://doi.org/10.1007/s11804-020-00141-7.
Written Opinion of the International Searching Authority for PCT/EP2022/069151 (PCT/ISA/237) mailed on Oct. 10, 2022.

* cited by examiner

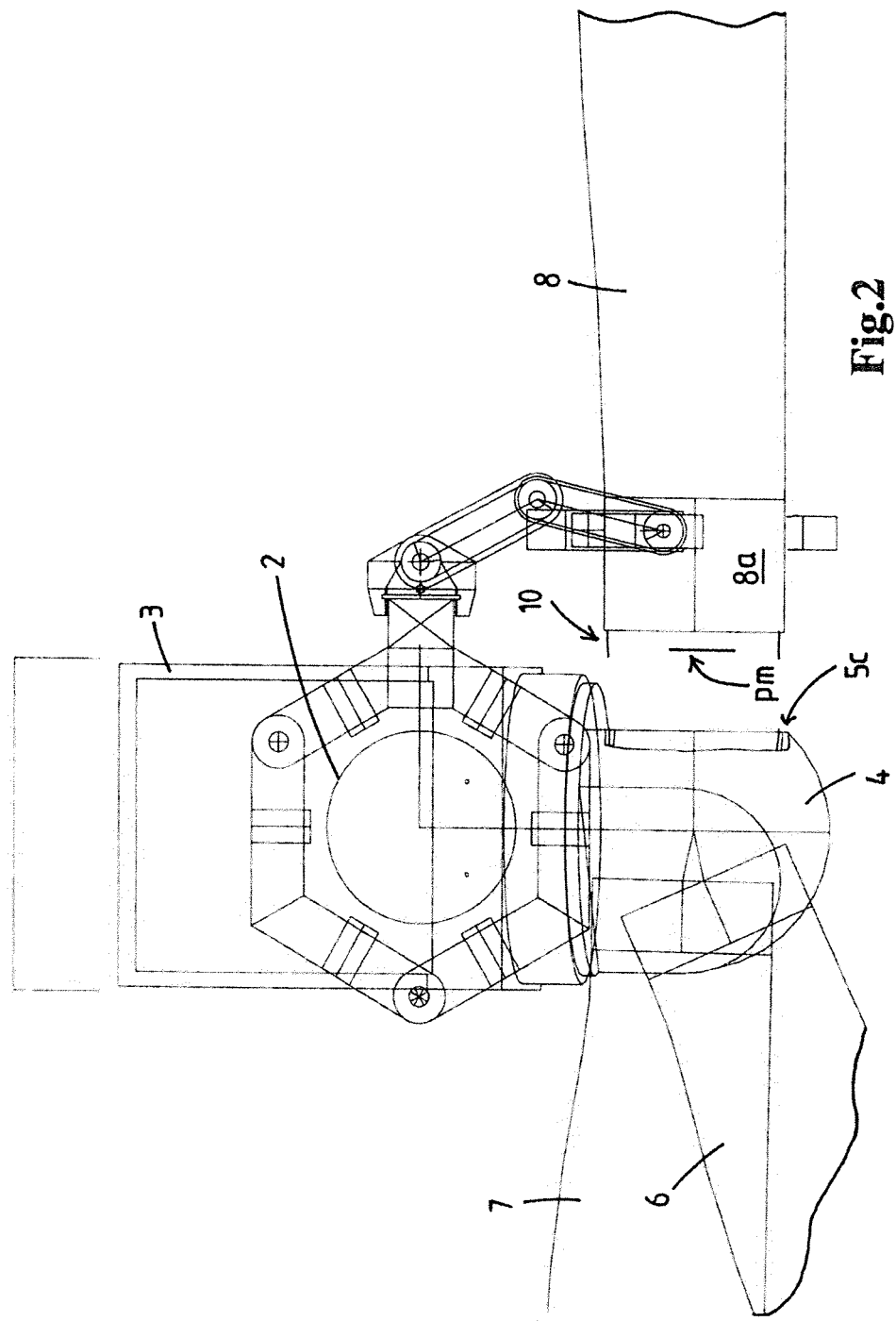

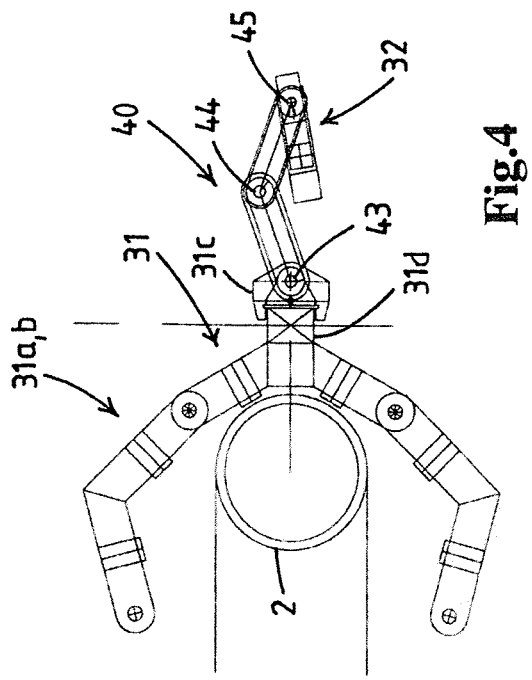
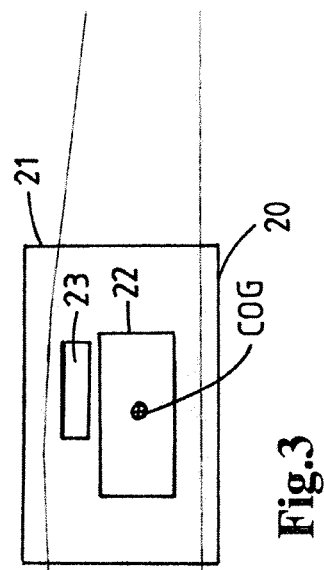
Fig. 4
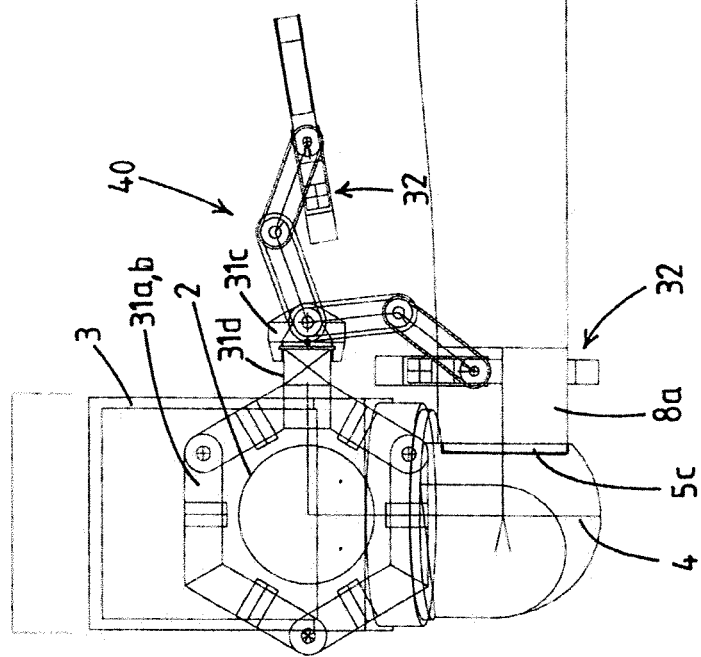
Fig. 3

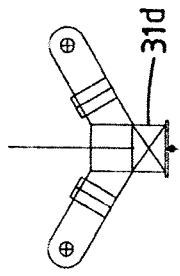
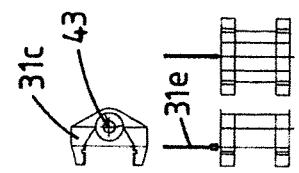
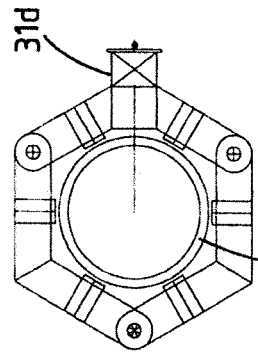
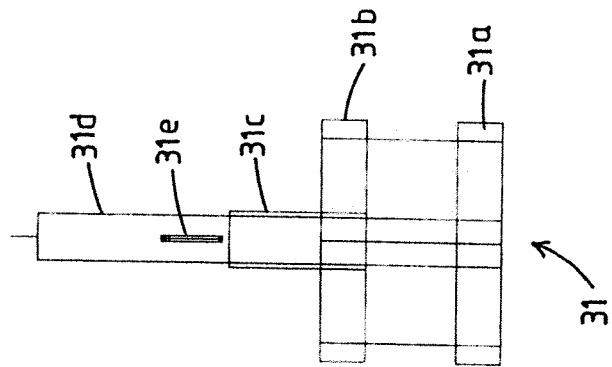
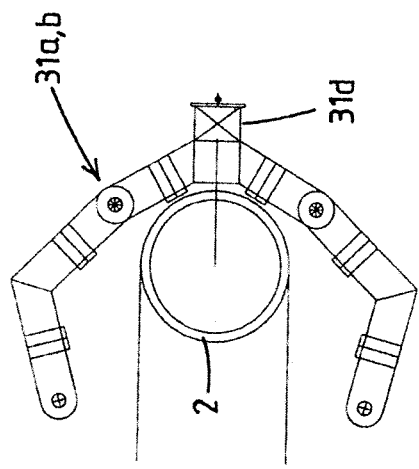
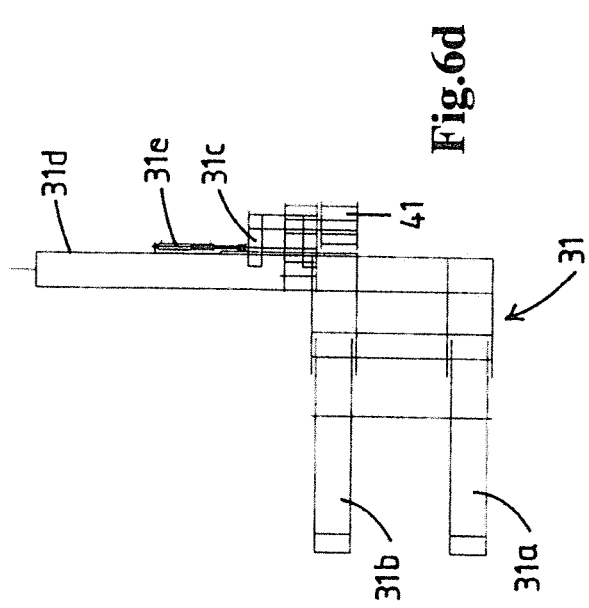

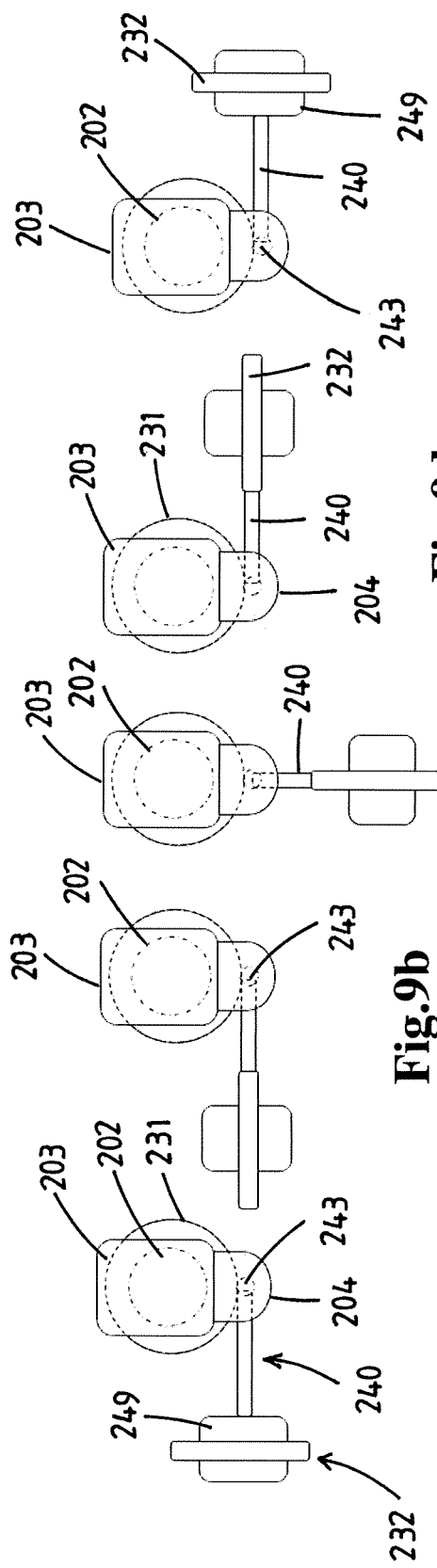

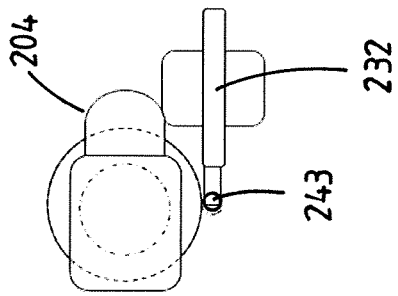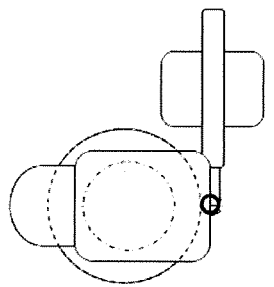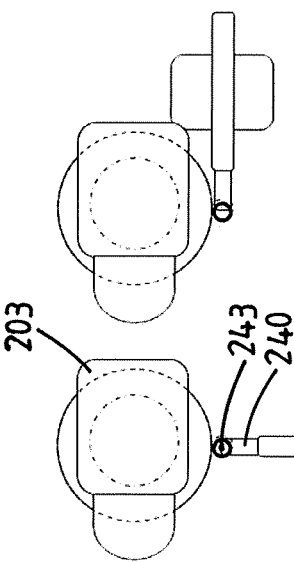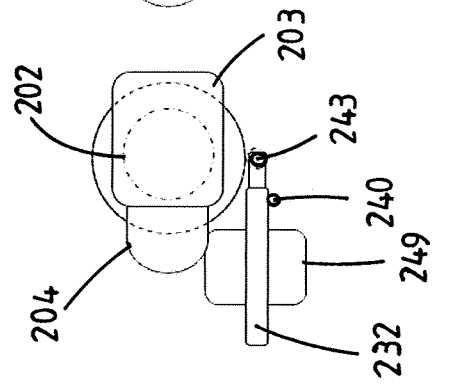

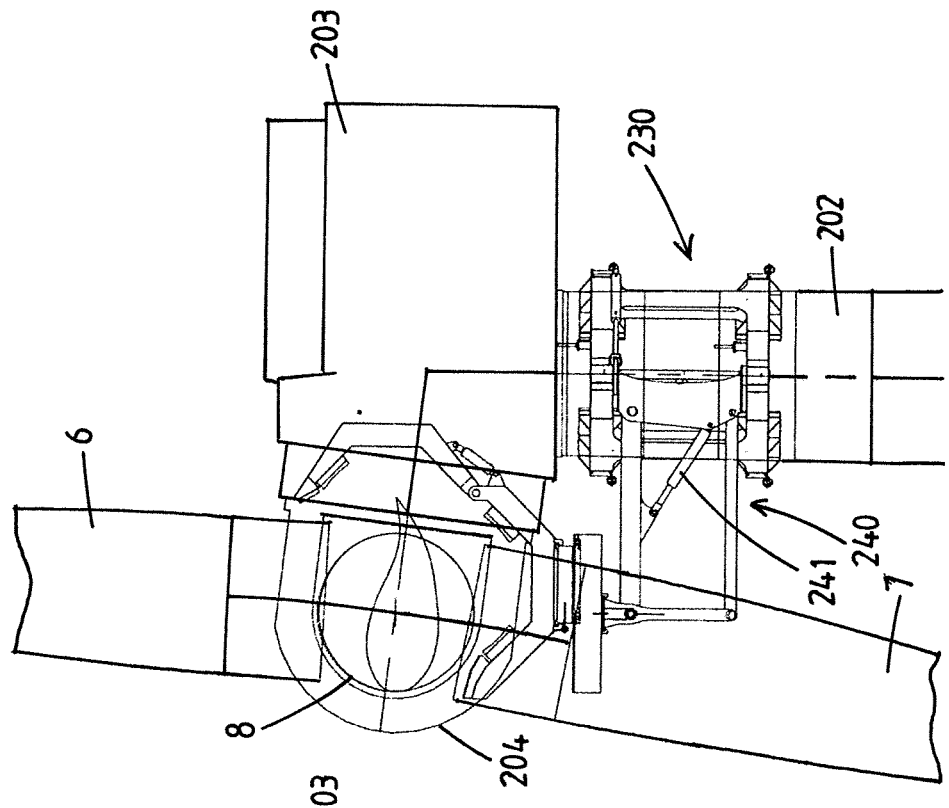
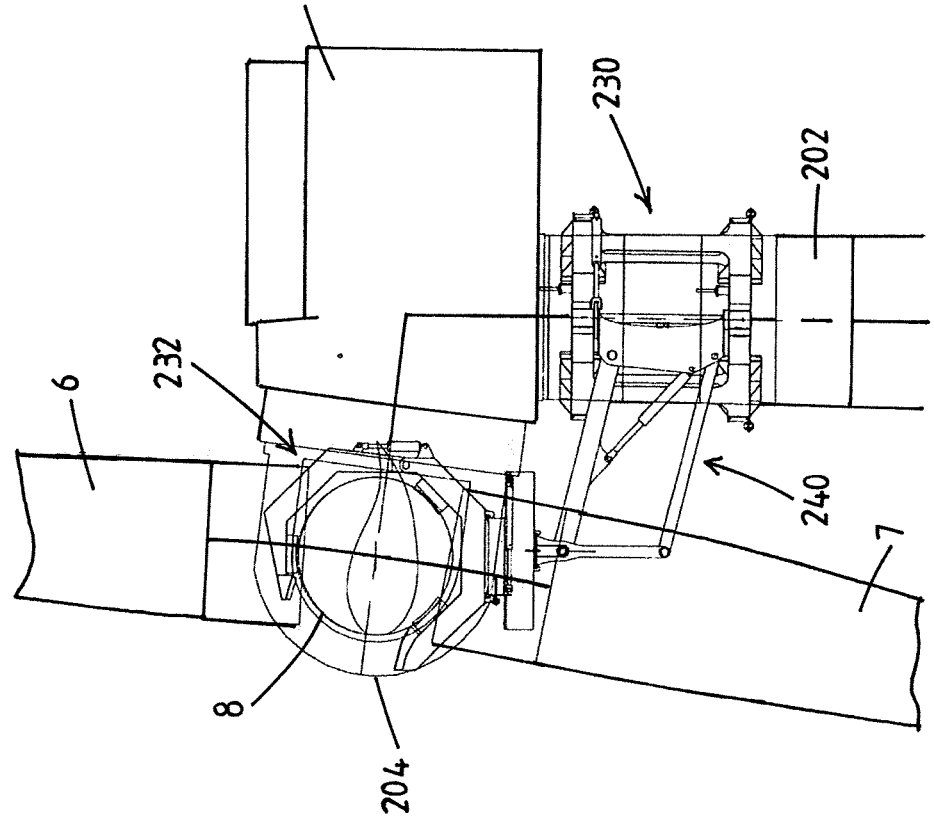

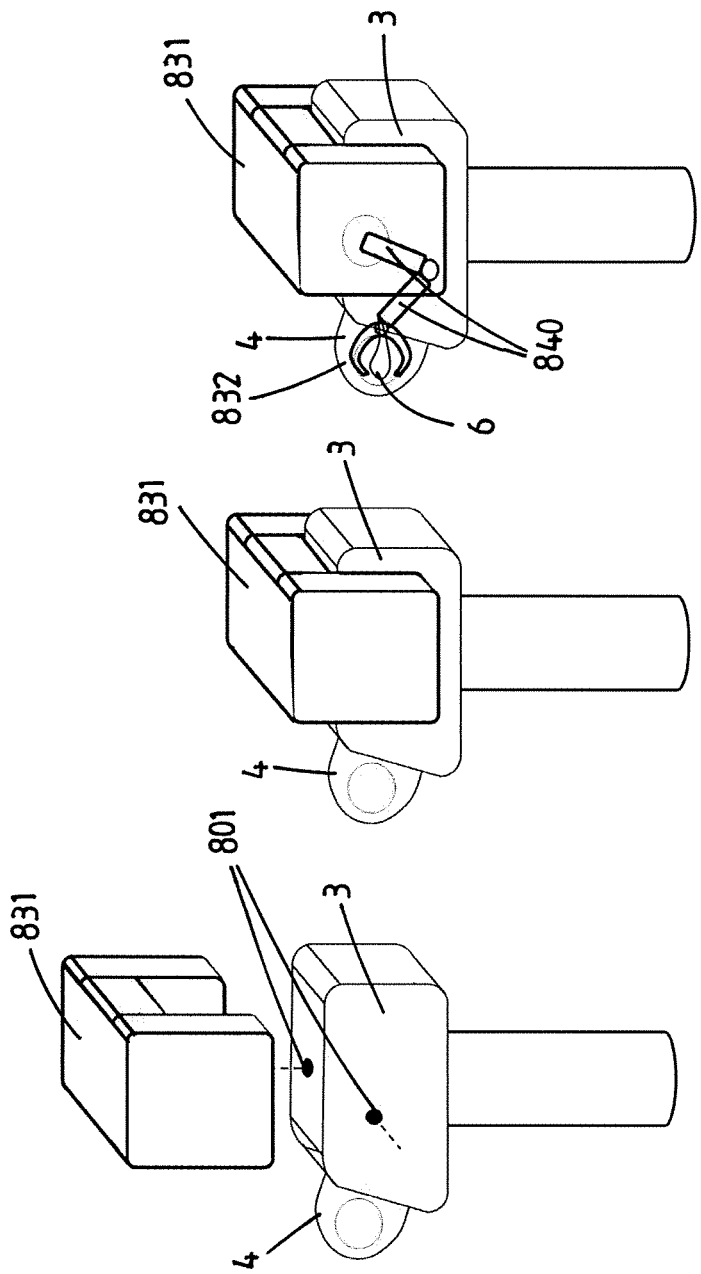

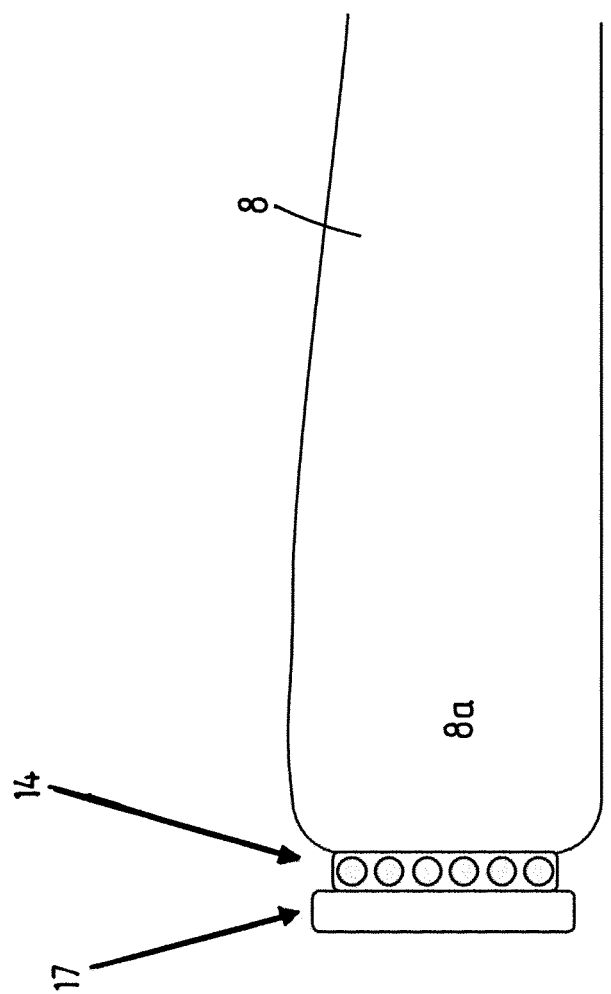

INSTALLATION OF A ROTOR BLADE IN HORIZONTAL ORIENTATION TO THE HUB OF A HORIZONTAL AXIS OFFSHORE WIND TURBINE THAT IS LOCATED OFFSHORE

The present invention relates to the installation of a rotor blade in horizontal orientation to the hub of an offshore wind turbine.

In the field of offshore wind farms a well-known offshore wind turbine has a foundation fixed to the seabed, e.g. a monopile, a tower (possibly with an intermediate transition piece) having a tower top, and a nacelle on the tower top. The nacelle has a hub with a horizontal axis, which hub has multiple mounting structures for the rotor blades. Each mounting structure commonly is provided with a pitch bearing and pitch adjustment device for the rotor blade.

The rotor blade is commonly made in general of composite material and has a blade body with a blade root, a blade tip, a length between the root and the tip, as well as a mass.

In common design of such rotor blades, the blade root is configured to be secured in a mounting position of the blade root to a blade mounting structure of the hub of the offshore wind turbine by means of one or more fasteners. A well-known embodiment, is the provision of a series of axial bolts that protrude from the stern face of the hollow blade root, e.g. in the form of so-called T-bolts. The mounting structure of the hub is provided with a circular flange provided with a matching series of bolt holes. Once the bolts are inserted through these bolt holes, nuts are fitted on the bolts to fasten the blade root to the hub.

The dimensions of the offshore wind turbines has steadily increased over the years, mainly in view of economical efficient energy generation. As a result, wind turbines having a capacity over 10 MW, e.g. 14 MW or recently 15 MW are now commercially available. These wind turbines have very large rotor blades, e.g. over 75 m, or even over 100 m in length. For example, each blade of the newly proposed Vestas 15 V236 turbine measures 115.5 meters long, giving it a total height of 261 meters above sea level. The Siemens Gamesa's SG 14-222 DD direct drive turbine has a blade of 108 meters in length. This market development further increase demands on the installation of a rotor blade to an offshore wind turbine. In such blades the blade root may have a diameter of over 5 m. The mass of a single blade may be well in excess of 50 tons.

In present day approaches to the installation of a rotor blade on an offshore wind turbine, it is rather common to lift the blade by means of a crane that is on-board of a vessel that is stationed next to the wind turbine to which the blade is to be mounted. The crane has a load connector suspended from one or more winch driven cables of the crane. A blade lifting tool is attached to the load connector and is engaged with the rotor blade in horizontal orientation. The crane is operated to lift the rotor blade whilst remaining in horizontal orientation to a height that is substantially level with a blade mounting structure of the offshore wind turbine, which is positioned in the so-called three o'clock or nine o'clock position. The crane is then operated to (slowly) bring the rotor blade closer to the mounting structure of the hub, often assisted by means of tugger wires and associated tugger winches to stabilize and align the blade so that the bolts can be introduced into the bolt holes.

It is noted as an aside that with the increasing dimensions and mass of the rotor blades, the so-called six o'clock installation has become even more problematic as it is difficult to hold the blade in such position.

Mating all the bolts on the blade root with the bolt holes of the mounting structure is difficult, and has become even more difficult with the developments discussed above. A major factor herein is the presence of relative motion between the mounting structure and the blade root.

This factor and the problems of mating the bolts and the bolt holes is discussed, for example, in the article "Effects of Wind-Wave Misalignment on a Wind Turbine Blade Mating Process: "Impact Velocities, Blade Root Damages and Structural Safety Assessment", Verma et al, 2019, Journal of Marine Science and Application, https://doi.org/10.1007/s11804-020-00141-7.

In this article it is described that the hub is subject to sea state induced motions, e.g. the waves hitting the monopile. The rotor blade obviously is subject to wind-induced motion, and in practice also crane induced motions (e.g. vibrations of the boom) may occur. The relative motion may be the source of undesirable impact or collision between one of more bolts and the hub or other part of the nacelle. This could be a head-on impact or a sideways impact, or combination thereof. This impact may lead to damage, even hidden damage, in the blade root, e.g. (minimal) cracking of the laminated composite material, and/or damage to one or more of the bolts, etc.

The article discusses that in practice at sea, the wind direction and the wave direction may be the same, yet they may also be different from one another. The latter is called wind-wave misalignment. As discussed, in both situations impact velocity may be such that undue damage occurs on impact. The article shows graphs wherein periodic hub motion in the horizontal or XY-plane is depicted for different angles between waves and wind. The amplitude of the periodic hub motion may be about 1 meter due to waves hitting the foundation. At the same time, the suspended blade is subject to its own periodic motion, so that significant relative motion is present in the mating process.

The sea state induced periodic hub motion clearly does not only play a role in the mating process during blade installation, but will persist during the lifetime of the wind turbine. Then the motion may, for example, cause extra load on the bearing arrangement of the hub and/or extra loads on other parts of the turbine. It has been proposed to equip the wind turbine with so-called vibration control devices. For example, in the article "Effective Optimal Vibration Control Methods for Offshore Wind Turbines", Patel et al, Economic and Engineering Perspectives, 2019, hal-01970664, it is discussed to provide the wind turbine with passive or active tuned mass dampers. These dampers are, for example, arranged in the tower or in the nacelle. In the field, the use of a tuned mass damper to reduce the relative motion during the mating of the blade root bolts with the bolt holes of the mounting structure of the hub has been studied and found to bring some relief.

In EP 3 792 211 the installation is discussed of a rotor blade in horizontal orientation to the hub of a horizontal axis offshore wind turbine that is located offshore. Herein use is made of a vessel that is provided with a crane having a load connector suspended from one or more winch driven cables of the crane. A blade lifting tool that is attached to the load connector and is engaged with a rotor blade in horizontal orientation. The crane is operated to lift the rotor blade whilst remaining in horizontal orientation to a height that is substantially level with a blade mounting structure of the offshore wind turbine. Then the blade root is brought close to the hub so that the bolts protrude through the bolt holes and nut are fitted to secure the blade.

In EP 2 538 073 it is proposed to provide temporarily a blade guide device on the wind turbine ahead of the blade installation. The rotor blade is lifted in horizontal orientation by a crane as the blade is held by a blade lifting tool. By operation of the crane, the blade root is brought close to the mounting structure and the exterior of the blade root comes into contact with the blade guide device. For example, the blade guide devices has rollers that contact the blade root. Further operation of the crane then moves the blade root into the mounting position, with the bolts entering the bolt holes.

In view of the mating process of the blade root with the mounting structure of the hub, the document WO2018/162101 proposes to arrange, cross-wise, multiple wires that have one end connected to the blade root and the other end connected to a winch that is located in the nacelle.

In WO2017/108053 another example of a blade lifting tool is disclosed.

It has been found that the known solutions for the installation of a rotor blade in horizontal orientation to the hub of a horizontal axis offshore wind turbine that is located offshore may be of some relief, yet still do not provide a satisfactory solution, e.g. in view of the window of wind and/or waves during which the installation can be carried out effectively. Neither are the known solutions satisfactory for the ever increasing dimensions of the offshore wind turbines, including the rotor blades thereof.

The invention provides a method according to claim 1.

In the inventive method use is made of a blade motion synchronization and positioning device, which device comprises:
- a wind turbine coupler, that is configured to releasably couple the device to the wind turbine,
- a blade coupler, e.g. a blade root coupler that is configured to couple to the exterior of the blade root,
- a motion arm between the wind turbine coupler and the blade coupler,
- a controllable motion arm actuator assembly comprising one or more actuators associated with the motion arm and a controller, the assembly being configured to provide controlled motion of the motion arm.

The wind turbine coupler is, preferably temporarily, coupled to the wind turbine. In a practical embodiment, this coupler is configured to couple to the tower, e.g. just under the nacelle. In an embodiment, the wind turbine coupler is configured to releasably clamp about the tower, e.g. fully about the tower. In another embodiment, this coupler is configured to couple to the nacelle, yet present designs of the nacelle do provide little suitable engagement features for which reason coupling to the sturdy tower is preferred.

Yet, in an embodiment wherein the wind turbine coupler is configured to couple to the nacelle, it is then preferred to utilize 'hard points' on and/or within the nacelle and/or horizontal axis hub of the wind turbine. These hard points are present on and/or within the nacelle and/or horizontal axis hub of the wind turbine for their initial purpose which is to be able to hoist the nacelle safely and effectively onto the tower. By making use of at least one, preferably three or more, of these hard points the wind turbine coupler of the blade motion synchronization and positioning device is still able to make a suitable coupling with the nacelle and/or horizontal axis hub.

As discussed above, in practice, the tower top is subject to sea state and/or wind induced tower top motion in at least one direction in a horizontal plane.

The inventive method of claim 1 comprises:
- operating the controllable motion arm actuator assembly to the bring and maintain the blade coupler in a motion compensated receiving position thereof, wherein the motion arm is operated to compensate for the tower top motion,
- coupling the blade coupler in said receiving position thereof to the rotor blade that is suspended from the crane, substantially level with a mounting structure of the hub of the wind turbine,
- with the blade coupler being coupled to the blade, e.g. the blade root coupler coupled to the blade root, —operating the controllable motion arm actuator assembly so as to gradually bring, and then maintain, the coupled blade, e.g. the blade root, in a horizontal motion that is synchronized with tower top motion, and
- possibly simultaneously with said synchronization, operating the controllable motion arm actuator assembly to displace the coupled blade root into a pre-mounting position that is closer to the mounting structure than the receiving position,
- operating the controllable motion arm actuator assembly to perform a mounting motion wherein the blade root is moved from the pre-mounting position into the mounting position, and keeping the blade root in mounting position during fastening of the blade root to mounting structure by one or more fasteners, e.g. bolts on the blade root.

In a preferred embodiment, the blade coupler is configured as a blade root coupler that engages on, e.g. clamps about, the exterior of the blade root of the rotor blade. In another embodiment, the blade coupler is configured and operated to engage on another portion of the rotor blade, e.g. on the aerofoil portion thereof. In yet another embodiment, the blade coupler is configured and operated to couple with the blade lifting tool, e.g. an extender member of said blade lifting tool that extends towards the blade root.

In the motion compensated receiving position the blade coupler, e.g. blade root coupler, is substantially compensated for the tower top motion by appropriate operation of the controllable motion arm actuator assembly, e.g. the motion arm folding and stretching in embodiments, so that this coupler does not exhibit the tower top motion. The compensation may be such that the blade coupler is at a stationary or stabilized position in space. This greatly facilitates the act of engaging the suspended rotor blade, e.g. the exterior of the blade root, with the blade root coupler. This engaging act may involve operating the crane to move the rotor blade but may also entail controlled engagement motion of the blade coupler.

The coupling of the blade coupler to the blade, e.g. the root, may be performed in a variety of manners, e.g. depending on the design of the blade coupler and/or of the blade/blade root. Apart for the preferred embodiment of a gripper as will be discussed herein in more detail, other designs are also possible. For example, the blade coupler may couple to the exterior of the blade or blade root by magnetically coupling, by vacuum coupling, etc.

Preferably, the blade coupler restrains the blade at least in the longitudinal direction of the blade. Possibly the blade coupler allows for (some) rotation of the blade about the longitudinal axis thereof, e.g. said rotation being caused by an appropriately design of the blade lifting tool, e.g. said rotation being performed in view of alignment of the bolts with the bolt holes. In another approach, such alignment is effected by rotation of the mounting structure, e.g. by means of the pitch adjustment mechanism thereof.

The initial coupling of the blade to the blade coupler, e.g. to the blade root, is, preferably, done at a fairly large distance, e.g. a safety distance, from the mounting structure, so as to practically exclude the possibility of impact between the blade root and the mounting structure or the nacelle.

For example, the blade coupler is motion compensated at such a location that mere slew motion of the crane, e.g. without luffing motion of the crane boom, brings the blade root in position for the initial coupling. Hereby, any disturbance of the blade stability caused by luffing of the crane boom, which may be over 100 meters long in practical embodiments, is avoided.

Once the coupling is effected, the controllable motion arm actuator assembly is operated to gradually bring, and then maintain, the coupled blade in a horizontal motion that is synchronized with tower top motion. Due to the use of an arm, both a force pulling the blade, e.g. the root, towards the mounting structure as well as a force pushing the blade, e.g. the root, away from the mounting structure can be exerted to cause the desired synchronization. The gradual approach is desired in view of the large mass of the rotor blade. For example, a rapid or even sudden approach would cause undue inertia-based forces, e.g. necessitating an unduly heavy motion arm and/or may cause excessive strain where the blade coupler engages the blade, e.g. the exterior of the blade root.

In some practical conditions, the tower top motion coincides mainly by a horizontally extending mounting axis defined by the mounting structure. As the blade is then, preferably, lifted by the crane so that the longitudinal axis of the blade coincides with this axis, the motion arm is then operated so that the synchronization takes place along this axis, so along the longitudinal axis of the blade suspended from the crane. As will be discussed below in more detail, the blade lifting tool and/or the crane may be configured and operated to let the blade follow this motion, so without being restrained by or unduly pulling on the crane, e.g. avoiding, or reducing vibrations of the boom due to the blade motion synchronization.

In some practical conditions, as discussed above, the tower top motion has a component that is perpendicular to the mounting axis or fully extends perpendicular to this axis. In these conditions, a blade root coupler will synchronize the blade root, yet the lengthy and heavy blade will likely not be following this synchronized motion. As will be explained herein, it is preferred for the blade root coupler to swivel relative to the motion arm about a Z-axis, or vertical axis, so as to avoid undue torsional load on the motion arm by the inertia of the massive rotor blade.

In embodiments, the motion arm is configured to provide for motion of the blade coupler solely in two non-parallel horizontal directions, so in a horizontal plane.

In embodiments, the motion arm is an articulated motion arm having multiple interconnected arm segments including an inner arm segment that is connected to the tower coupler and an outer arm segment that carries the blade coupler, possible also one or more intermediate arm segments between the inner and outer arm segments. In a practical embodiment, the arm segments are connected to one another via a Z-axis hinge. In an embodiment, the motion arm solely provides for motion in two non-parallel horizontal directions of a blade root gripper.

In a practical embodiments, all arm segments of the articulated motion arm are fixed length arm segments. In another embodiment, one or more of the arm segments are embodied as a telescopic arm segment.

In alternative embodiments the motion arm, and one or more of its segments, is configured for motion in and/or rotation around X, Y and Z such that more freely articulated movement is enabled. This is particularly useful when the wind turbine coupler of the blade motion synchronization and positioning device has been mounted to the nacelle and/or the horizontal axis hub of the wind turbine, such that the motion arm is able and configured to manoeuvre and reach around the nacelle and/or the horizontal axis hub and already installed wind turbine blades.

In embodiments, the blade coupler, e.g. blade root coupler, is carried on the motion arm, e.g. the articulated motion arm, so as to be pivotal relative to the motion arm, e.g. the outer arm segment, at least about a Z-axis swivel pivot, e.g. freely pivotal or provided with a damping arrangement, allowing for sway motion of rotor blade suspended from the crane about this Z-axis swivel when coupled to the blade coupler. Due to the enormous size and mass of the rotor blade, the blade can exert an enormous torque on the blade root coupler when sway of the blade suspended from the crane, mainly in a horizontal plane, occurs. The Z-axis swivel may avoid or reduce the effect that the motion arm is (over)loaded by this torque.

In embodiments, the blade root coupler is an openable gripper that is configured to grip about the blade root, e.g. about a blade root having a diameter of at least 3 meters, e.g. of more than 4 meters.

In embodiments, the gripper has a gripper base that is connected to the motion arm, e.g. via the Z-axis swivel discussed above, and the gripper has one or more movable, e.g. pivotal, gripper jaws, e.g. mounted on the gripper base, e.g. one gripper jaw at each circumferential end of the gripper base.

In embodiments, the method comprises, with the blade root gripper in its motion compensated receiving position, the opening of the gripper so that the coupling or engaging of the blade root comprises resting the blade root on a gripper base, e.g. by lowering the blade trough operation of the crane, and then closing the gripper about the blade root by actuation of the one or more movable, e.g. pivotal, gripper jaws. For example, one or more gripper jaws are hydraulically actuated.

In embodiments, during the act of engagement of the blade root, the motion arm is operated so that blade root gripper is on the one hand compensated for tower top motion and on the other hand is caused to follow motion, e.g. sway, of the still not engaged blade root as the blade is suspended from the crane. It is noted that such motion of the blade, which effectively renders the engagement even more problematic, can also be (partly) countered by means associated with the crane and/or the blade lifting tool. For example, one or more tugger lines and associated winches can be employed to counter sway of the blade suspended from the crane. For example, the blade lifting tool may be equipped with means to counter sway, e.g. one or more gyroscopes, propellors that create air thrust, etc.

In embodiments, the synchronization of the coupled blade with the tower top motion is effected prior to displacing the coupled blade root into the pre-mounting position. For example, the articulated motion arm, whilst stabilizing the blade coupler in the receiving position, initially behaves like/is operated as a limp, flexible arm to compensate the tower top motion, and is then, e.g. gradually, stiffened, or made to behave stiffer, so that the blade gradually assumes the motion of the tower top and is no longer compensated for such motion. It will be appreciated that in view of the mass of the blade a gradual reduction of the compensating operation of the arm is preferred, so that the blade is gradually brought into the synchronised motion without undue stresses/load occurring in the process.

In embodiments, the synchronization of the coupled blade with the tower top motion is effected at last in part simultaneously with displacing the coupled blade root into the pre-mounting position.

In embodiments, the method comprises a verification step that is performed with the blade root in the pre-mounting position and prior to initiating the mounting motion, which verification step comprises verification of the synchronization and/or of the alignment of the blade root with the mounting structure. As explained, the consequences of a collision between the blade root, in particular any bolts thereon, and the mounting structure or other part of the hub, and/or nacelle, can be drastic and irreversible. For example, a collision may damage the blade root, e.g. cracking of the laminated structure, such that installation of the blade is no longer possible, e.g. the blade needing to the shipped back to the factory for repairs. The verification step seeks to avoid this situation, e.g. by accurately measuring, e.g. using surveying equipment, the line-up of the blade with the axis along which the mounting motion is to be performed, and/or of the position of any bolts and/or temporary guides (e.g. to be later replaced by bolts) relative to the mounting structure, etc.

In embodiments, the crane has a boom, and the crane is provided with a load connector active position control system that is configured and operated to actively control the position of the load connector in at least one horizontal direction, preferably in at least two non-parallel horizontal directions, relative to the boom. Examples of cranes having such capabilities are disclosed in WO2019156556, WO2018199743, and WO2018106105. In embodiments, the method comprises operating the load connector active position control system of the crane in synchronicity with the blade coupler when coupled to the blade, e.g. as the blade root coupler moves in sync with the tower top motion, e.g. whilst the blade root is controllably advanced towards the pre-mounting position and/or to the mounting position. This approach effectively seeks to reduce or eliminate the effect that the suspension of the blade from the crane interferes with, and/or placed undue loads or stresses on, the motion arm. In embodiments, the load connector active position control system is configured and operated to cause the blade lifting tool to be moved in sync with the tower top motion, e.g. at least in one horizontal direction, possibly in two non-parallel directions in a horizontal plane.

In embodiments, the blade lifting tool comprises a frame that is attached to the load connector of the crane, wherein the blade lifting tool comprises a blade holding assembly that is mobile mounted relative to the frame, e.g. at least mobile relative to the frame in one horizontal direction, e.g. along a length of the rotor blade held by the blade holding assembly, preferably two non-parallel horizontal direction, wherein the blade lifting tool comprises a controllable motion actuator device between frame and blade holding assembly. For example, the method comprises operating the controllable motion actuator device to move the blade holding assembly relative to the frame in synchronicity with the blade root coupler when coupled to the exterior of the blade root. For example, the blade lifting tool comprises an active COG (centre of gravity) balancing system with a counterweight that is mobile mounted relative to frame and with a controlled motion actuator device between the frame and the counterweight, wherein the method comprises moving the counterweight relative to the frame in order to cause a common centre of gravity of the blade mass and the lifting tool to remain stable in a horizontal plane when the blade holding assembly and the blade held thereby are moved relative to the frame.

In an alternative embodiment, the blade lifting tool further comprises a secondary motion arm and secondary blade root coupler similar to the motion arm and blade root coupler as part of the blade motion synchronization and positioning device mounted to the wind turbine. In this embodiment the blade root coupler is configured to couple with the secondary blade root coupler of the secondary arm instead of coupling with the actual blade root of the wind turbine blade held by the blade lifting tool. Alternatively, the blade root couplers are replaced by interlocking motion arm couplers achieving the same result.

Here, the method as described remains similar wherein the added arm allows for an increased flexibility in motion synchronization and/or compensation. Both arms can be configured to, after coupling, contribute to the stiffening of the connection between the wind turbine and blade lifting tool.

In embodiments, use is made of one or more sensors that measure the distance and/or position and/or angular orientation of the blade root relative to the mounting structure, e.g. said one or more sensors being linked to the controller of the controllable motion arm actuator assembly and/or to load connector active position control system and/or to the controllable motion actuator device that moves the blade holding assembly relative to the frame.

In embodiments, the method comprises the use of a control unit for control of the motion arm, e.g. said control unit being operated by a human operator that is present in the nacelle or on a platform or cabin on or in proximity of the nacelle, e.g. on the wind turbine coupler.

In embodiments, after completion of fastening of the rotor blade to the hub of the offshore wind turbine, the blade coupler is released from the blade, e.g. from the blade root, and the motion arm is then operated to move into a retracted configuration thereof, wherein a clearance is provided for the installed rotor blade during a rotation of the hub that is done so as to bring another one of the mounting structures into position for the installation of another rotor blade to the offshore wind turbine.

In embodiments, the method comprises an emergency distancing routine, wherein the motion arm is operated to cause a rapid distancing of blade root away from nacelle, e.g. in case of a power and/or control signal anomaly, e.g. black-out, and/or in case of an anomaly in wind condition and/or sea state, e.g. wind gust, freak wave, etc.

The present invention also relates to a blade motion synchronization and positioning device configured for use in the installation of a rotor blade in horizontal orientation to a mounting structure of a hub of a horizontal axis offshore wind turbine that is located offshore, e.g. according to a method as described herein, e.g. as in claim 1 and any one or more of the related subclaims.

The device comprises:
  a wind turbine coupler, that is configured to releasably couple the device to the wind turbine,
  a blade coupler, e.g. a blade root coupler that is configured to couple to the exterior of a blade root of a rotor blade,
  a motion arm between the wind turbine coupler and the blade coupler,
  a controllable motion arm actuator assembly comprising one or more actuators associated with the motion arm and a controller, the assembly being configured to provide controlled motion of the motion arm.

The controllable motion arm actuator assembly is configured and operable to the bring and maintain the blade coupler in a motion compensated receiving position thereof, wherein the motion arm is configured to compensate for sea state and/or wind induced tower top motion in at least one direction in a horizontal plane.

In an embodiment the controllable motion arm actuator assembly is configured and operable to the bring and maintain the blade coupler in a motion compensated receiving position thereof, wherein the motion arm is configured to compensate for sea state and/or wind induced tower top motion in at least one direction in a horizontal plane as well as a vertical plane.

The blade coupler is configured and operable to be coupled in said receiving position thereof to a rotor blade that is suspended from a crane, substantially level with a mounting structure of the hub of the wind turbine, e.g. to the blade root of the rotor blade.

With the blade coupler being coupled to the blade, the controllable motion arm actuator assembly is operable so as to gradually bring, and then maintain, the coupled blade in a horizontal motion that is synchronized with said tower top motion, and possibly simultaneously with said synchronization, the controllable motion arm actuator assembly is operable to displace the coupled blade root into a pre-mounting position that is closer to the mounting structure than the receiving position. The controllable motion arm actuator assembly is operable to perform a mounting motion wherein the blade root is moved from the pre-mounting position into the mounting position, and to keep the blade root in mounting position during fastening of the blade root to mounting structure by one or more fasteners.

In an embodiment, as discussed above, the motion arm is configured to provide for motion solely in two non-parallel horizontal directions.

In embodiments, the motion arm is an articulated motion arm having multiple interconnected arm segments including an inner arm segment that is connected to the wind turbine coupler and an outer arm segment that carries the blade coupler, possible also one or more intermediate arm segments. Preferably, the arm segments are connected to one another via a Z-axis hinge, e.g. solely providing for motion in two non-parallel horizontal directions.

In embodiments, the wind turbine coupler is configured to releasably couple to the tower of the wind turbine, e.g. clamping around the tower, preferably just under the nacelle.

In embodiments, the wind turbine coupler is configured to releasably couple to the nacelle of the wind turbine, e.g. in a preferable and practical embodiment thereof the wind turbine coupler couples with one or more hard points on and/or within the nacelle.

In embodiments, the wind turbine coupler is configured to releasably couple to the horizontal axis hub of the wind turbine, e.g. coupled to one or more hard points on and/or within the horizontal axis hub of the wind turbine.

In embodiments, the wind turbine coupler is configured to releasably couple to the horizontal axis hub of the wind turbine, e.g. coupled to one or more blade mounting structures.

In embodiments, the wind turbine coupler is configured to releasably couple to the nacelle and the horizontal axis hub of the wind turbine, e.g. coupled to one or more hard points on and/or within the nacelle and to one or more hard points on and/or within the horizontal axis hub of the wind turbine.

In embodiments, the blade coupler is configured and operable to be releasably coupled in a receiving position thereof to a secondary blade coupler attached to a secondary motion arm mounted to a blade lifting tool suspended from a crane, in which a rotor blade is carried.

With the blade coupler being coupled to the secondary blade coupler, one or both controllable motion arm assemblies are operable so as to gradually bring, and then maintain, the blade carried by the now coupled blade lifting tool in a horizontal motion that is synchronized with said top tower motion, and possibly simultaneously with said synchronization, one or both of the controllable motion arm actuator assemblies are operable to displace the blade root carried by the blade lifting tool into a pre-mounting position that is closer to the mounting structure than the receiving position. The controllable motion arm actuator assemblies are operable to perform a mounting motion wherein the blade root is moved from the pre-mounting position into the mounting position, and to keep the blade root in mounting position during fastening of the blade root to mounting structure by one or more fasteners.

In embodiments, the motion arm comprises a controllably actuated hinged parallelogram mechanism, preferably allowing for movement in a vertical plane by operation of the mechanism.

In embodiments, the parallelogram mechanism is configured to be actuated to be able to perform a motion in a Z-axis direction on one end of the mechanism.

In embodiments, the parallelogram mechanism comprises one or two vertical members, and the mechanism is configured to allow for rotation around one or both vertical members, parallel to or coincident with the Z axis.

In embodiments, the motion arm comprises an X-Y stage, wherein the movement in X and Y direction are independently controlled and/or actuated.

In embodiments, the motion arm comprises an X-Y-θ stage, wherein the movement in X and Y direction and rotations θ are independently controlled and/or actuated.

In embodiments, the motion arm comprises an X-Y-Z-θ-ψ-φ stage, wherein the movement in X Y and Z direction and rotations θ, ψ and φ are decoupled such that they can be individually controlled and/or actuated.

In embodiments, the X-Y or X-Y-θ stage is mounted on the end of one or more arm segments of the motion arm.

In embodiments, the X-Y-Z-θ-ψ-φ stage is mounted on the end of one or more arm segments of the motion arm.

In embodiments, the blade coupler, e.g. blade root coupler, is carried on the motion arm so as to be pivotal relative to the motion arm at least about a Z-axis swivel pivot, e.g. freely pivotal or provided with a damping arrangement, allowing for sway motion of rotor blade suspended in horizontal orientation from a crane of a vessel about the Z-axis swivel when coupled to the blade coupler.

In embodiments, the blade root coupler is an openable gripper that is configured to grip about the blade root of the blade. For example, the gripper has a gripper base connected to the motion arm, e.g. via the Z-axis swivel. For example, the gripper has one or more movable, e.g. pivotal, gripper jaws, e.g. one at each circumferential end of the gripper base.

In embodiments wherein use is made of a secondary motion arm mounted to the blade lifting tool, the blade root coupler is configured to couple with the secondary blade root coupler instead of the blade root itself. Alternatively the blade root couplers are replaced by interlocking motion arm couplers. For example, the two blade root couplers acting as a ball in socket coupling, wherein one coupler is configured to grab around the other. Or, for example, as two interlocking grippers, or for example as a pin through a hoop or male-female connection wherein one coupler comprises a receiving ring or hole and the other coupler part is configured to be inserted into this ring or hole and connect to each other, e.g. by a hook.

In embodiments, the blade coupler, e.g. blade root coupler, is mounted on an X-Y or X-Y-θ stage and is configured to be pivotal relative to the motion arm at least about a Z-axis swivel pivot, e.g. by using the available rotational motion of the X-Y-θ stage, e.g. freely pivotal or provided with a damping arrangement, allowing for sway motion of rotor blade suspended in horizontal orientation from a crane of a vessel about the Z-axis swivel when coupled to the blade coupler.

In embodiments, the blade coupler, e.g. blade root coupler, is mounted on the X-Y-Z-θ-ψ-φ stage and is configured to be pivotal relative to the motion arm at least about a Z-axis swivel pivot, e.g. by using the available rotational motion of the X-Y-Z-θ-ψ-φ stage, e.g. freely pivotal or provided with a damping arrangement, allowing for sway motion of rotor blade suspended in horizontal orientation from a crane of a vessel about the Z-axis swivel when coupled to the blade coupler.

In embodiments, the blade root coupler is configured to open the gripper so that coupling of the blade root comprises resting the blade root on the gripper base and then to close the gripper by actuation of the one or more gripper jaws.

In embodiments, the motion arm is configured to allow for rotation around the base of the motion arm such that it is able to rotate around the nacelle from one side to the opposite side, e.g. allowing the blade root coupler to carry or guide a blade from one side of the nacelle to the other side of the nacelle enabling different mounting locations.

In embodiments, the motion arm is dimensioned such that the end of the motion arm is able to move around the nacelle, e.g. from one side to the opposite side, e.g. allowing the blade root coupler to carry or guide a blade from one side of the nacelle to the other side of the nacelle enabling different mounting locations.

In embodiments, the motion arm is dimensioned such that the blade root coupler located at the end of the motion arm can be moved around the nacelle, e.g. from one side to the opposite side, e.g. allowing the blade root coupler to carry or guide a blade from one side of the nacelle to the other side of the nacelle enabling different mounting locations.

In embodiments, the motion arm is configured to move with respect to or in conjunction with the nacelle such that the end of the motion arm or the blade root coupler can be moved around the nacelle, e.g. from one side to the opposite side, e.g. allowing the blade root coupler to carry or guide a blade from one side of the nacelle to the other side of the nacelle enabling different mounting locations.

In embodiments, the device comprises one or more sensors that are configured to measure the distance and/or position and/or angular orientation of the blade coupler and/or the coupled blade root relative to the mounting structure, e.g. said one or more sensors being linked to the controller of the controllable motion arm actuator assembly.

In embodiments, the device comprises a control unit for control of the motion arm, for example said control unit being operable by a human operator present in the nacelle.

In embodiments, any one or more of the motion arm, the X-Y stage, X-Y-θ stage and/or the X-Y-Z-θ-ψ-φ stage comprises a fine actuation means for finer actuation of minor motions to compensate for motions during the mounting motion.

The invention also relates to a system for use in the installation of a rotor blade in horizontal orientation to a mounting structure of a hub of a horizontal axis offshore wind turbine that is located offshore, e.g. according to a method as discussed herein, e.g. according to claim 1, wherein the system comprises:

a blade motion synchronization and positioning device as discussed herein, a vessel that is provided with a crane having a load connector suspended from one or more winch driven cables of the crane, a blade lifting tool that is attached or attachable to the load connector and configured to be engaged with a rotor blade in horizontal orientation thereof, which rotor blade has a blade body with a blade root, a blade tip, a length, and a rotor blade mass, wherein the blade root has an exterior and is configured to be secured in a mounting position of the blade root to a blade mounting structure of the hub of the offshore wind turbine by means of one or more fasteners, wherein the crane is configured to lift the rotor blade whilst remaining in horizontal orientation to a height that is substantially level with a blade mounting structure of the offshore wind turbine.

In embodiments of the system, the crane has a boom, wherein the crane is provided with a load connector active position control system that is configured and operated to actively control the position of the load connector in at least one horizontal direction, preferably two non-parallel horizontal directions, relative to the boom, wherein the system is configured to operate the load connector active position control system in synchronicity with the blade root coupler when coupled to the exterior of the blade root.

In embodiments of the system, the blade lifting tool comprises a frame that is attached to the load connector of the crane, and the blade lifting tool comprises a blade holding assembly that is mobile mounted relative to the frame, e.g. at least mobile relative to the frame in one horizontal direction, e.g. along a length of the rotor blade held by the blade holding assembly, preferably two non-parallel horizontal directions, and wherein the blade lifting tool comprises a controllable motion actuator device between frame and blade holding assembly. For example, the system is configured to operate the controllable motion actuator device so as to move the blade holding assembly relative to the frame in synchronicity with the blade root coupler when coupled to the exterior of the blade root. For example, the blade lifting tool comprises an active COG balancing system with a counterweight that is mobile mounted relative to frame and with a controlled motion actuator device between the frame and the counterweight, wherein the system is configured to move the counterweight relative to the frame in order to cause a common centre of gravity of the blade mass and the lifting tool to remain stable in a horizontal plane when the blade holding assembly and the blade held thereby are moved relative to the frame.

In embodiments of the system, the system comprises one or more sensors that are configured to measure the distance and/or position and/or angular orientation of the blade coupler and/or blade root coupled thereto relative to the mounting structure, e.g. said one or more sensors being linked to the controller of the controllable motion arm actuator assembly and/or to load connector active position control system and/or to the controllable motion actuator device that moves the blade holding assembly relative to the frame.

In embodiments of the system wherein use is made of a secondary motion arm mounted on the blade lifting tool, the system comprises one or more sensors that are configured to measure the distance and/or position and/or angular orientation of the blade lifting tool and/or blade root carried therein relative to the mounting structure, e.g. said one or more sensors being linked to the controller of the one or more controllable motion arm actuator assemblies and/or to a load connector active position control system and/or to the controllable motion actuator device that moves the blade holding assembly relative to the frame.

In embodiments, the motion arm is configured so that, after completion of fastening of the rotor blade to the mounting structure of the hub of the offshore wind turbine and release of the blade coupler from the blade, the motion arm is operable to be moved into a retracted configuration wherein clearance is provided for the installed rotor blade during a rotation of the hub that is done so as to bring another one of the mounting structures into position for the installation of another rotor blade to the offshore wind turbine.

In embodiments, the system is configured to perform an emergency distancing routine, wherein the motion arm is operated to cause a rapid distancing of blade root away from nacelle, e.g. in case of a power and/or control signal anomaly and/or in case of an anomaly in wind condition and/or sea state.

The present invention also relates to a combination of:
a blade motion synchronization and positioning device as described herein, and
a blade lifting tool configured to be engaged with a rotor blade in horizontal orientation thereof, wherein the blade lifting tool comprises a frame that is configured to be attached to a load connector that is suspended from one or more winch driven cables of a crane of a vessel, wherein the blade lifting tool comprises a blade holding assembly that is mobile mounted relative to the frame, e.g. at least mobile relative to the frame in one horizontal direction, e.g. along a length of the rotor blade held by the blade holding assembly, preferably two non-parallel horizontal direction, and wherein the blade lifting tool comprises a controllable motion actuator device between frame and blade holding assembly.

In embodiments, the combination is configured to operate the controllable motion actuator device so as to move the blade holding assembly relative to the frame in synchronicity with the blade root coupler when coupled to the exterior of the blade root.

In embodiments, the blade lifting tool comprises an active COG balancing system with a counterweight that is mobile mounted relative to frame and with a controlled motion actuator device between the frame and the counterweight, wherein the system is configured to move the counterweight relative to the frame in order to cause a common centre of gravity of the blade mass and the lifting tool to remain stable in a horizontal plane when the blade holding assembly and the blade held thereby are moved relative to the frame.

In embodiments, the combination comprises one or more sensors that are configured to measure the distance and/or position and/or angular orientation of the blade and/or blade root coupled thereto relative to the mounting structure, e.g. said one or more sensors being linked to the controller of the controllable motion arm actuator assembly and/or to load connector active position control system and/or to the controllable motion actuator device that moves the blade holding assembly relative to the frame.

The present invention also relates to a blade lifting tool for use in the installation of a rotor blade in horizontal orientation to a mounting structure of a hub of a horizontal axis offshore wind turbine that is located offshore, e.g. according to a method as described herein, which blade lifting tool is configured to be engaged with a rotor blade in horizontal orientation thereof, wherein the blade lifting tool comprises a frame that is configured to be attached to a load connector that is suspended from one or more winch driven cables of a crane of a vessel, wherein the blade lifting tool comprises a blade holding assembly that is mobile mounted relative to the frame, e.g. at least mobile relative to the frame in one horizontal direction, e.g. along a length of the rotor blade held by the blade holding assembly, preferably two non-parallel horizontal direction, and wherein the blade lifting tool comprises a controllable motion actuator device between frame and blade holding assembly.

In embodiments, the blade lifting tool is configured to operate the controllable motion actuator device so as to move the blade holding assembly relative to the frame in synchronicity with a blade root coupler when coupled to the exterior of the blade root.

In embodiments, the blade lifting tool comprises an active COG balancing system with a counterweight that is mobile mounted relative to frame and with a controlled motion actuator device between the frame and the counterweight, wherein the system is configured to move the counterweight relative to the frame in order to cause a common centre of gravity of the blade mass and the lifting tool to remain stable in a horizontal plane when the blade holding assembly and the blade held thereby are moved relative to the frame.

In embodiments, the blade lifting tool comprises one or more sensors that are configured to measure the distance and/or position and/or angular orientation of the blade lifting tool relative to the blade root coupler and/or blade root coupled thereto relative to the mounting structure, e.g. said one or more sensors being linked to the controller of the controllable motion arm actuator assembly and/or to load connector active position control system and/or to the controllable motion actuator device that moves the blade holding assembly relative to the frame.

Whilst it is presently preferred that the blade motion synchronization and positioning device is initially coupled to the wind turbine, e.g. to the tower, e.g. to the tower just below the nacelle, the inventive concept may also be implemented in alternative manners.

In one alternative manner, the invention provides a method for installation of a rotor blade in horizontal orientation to the hub of a horizontal axis offshore wind turbine that is located offshore,
wherein the offshore wind turbine comprises:
  a foundation,
  a tower mounted on the foundation and having a tower top,
  a nacelle on the tower top, the nacelle being provided with
    a horizontal axis hub having multiple blade mounting structures, each configured for securing thereto a rotor blade,
wherein use is made of a vessel that is provided with a crane having a load connector suspended from one or more winch driven cables of the crane,
wherein a blade lifting tool that is attached to the load connector is engaged with a rotor blade in horizontal orientation, which rotor blade has a blade body with a blade root, a blade tip, a length, and a rotor blade mass, wherein the blade root has an exterior and is configured to be secured in a mounting position of the blade root to a blade mounting structure of the hub of the offshore wind turbine by means of one or more fasteners, wherein the crane is operated to lift the rotor blade whilst remaining in horizontal orientation to a height that is substantially level with a blade mounting structure of the offshore wind turbine, wherein use is made of a blade motion synchronization and positioning device, which device comprises:
  a wind turbine coupler, that is configured to releasably couple the device to the wind turbine,
  a blade coupler, e.g. a blade root coupler that is configured to couple to the exterior of the blade root,
  a motion arm between the wind turbine coupler and the blade coupler,
  a controllable motion arm actuator assembly comprising one or more actuators associated with the motion arm and a controller, the assembly being configured to provided controlled motion of the motion arm, wherein the wind turbine coupler is initially not coupled to the wind turbine, and wherein the blade coupler is initially coupled to the rotor blade, e.g. the blade root coupler being coupled to the blade root, wherein the tower top is subject to sea state and/or wind induced tower top motion in at least one direction in a horizontal plane, wherein the method comprises:
  with the rotor blade being suspended from the crane, substantially level with a mounting structure of the hub of the wind turbine-operating the controllable motion arm actuator assembly to the bring and maintain the wind turbine coupler in a motion compensated engaging position thereof, wherein the motion arm is operated to compensate for the tower top motion,
  coupling the wind turbine coupler in said engaging position thereof to the wind turbine,
  with the wind turbine coupler being coupled to the wind turbine-operating the controllable motion arm actuator assembly so as to gradually bring, and then maintain, the coupled blade in a horizontal motion that is synchronized with tower top motion, and
  possibly simultaneously with said synchronization, operating the controllable motion arm actuator assembly to displace the coupled blade root into a pre-mounting position that is closer to the mounting structure than when the wind turbine coupler engaged on the wind turbine,
  operating the controllable motion arm actuator assembly to perform a mounting motion wherein the blade root is moved from the pre-mounting position into the mounting position, and keeping the blade root in mounting position during fastening of the blade root to mounting structure by one or more fasteners.

The present invention also relates to a method for installation of a rotor blade in horizontal orientation to the hub of a horizontal axis offshore wind turbine that is located offshore, wherein the offshore wind turbine comprises:
  a foundation,
  a tower mounted on the foundation and having a tower top,
  a nacelle on the tower top, the nacelle being provided with a horizontal axis hub having multiple blade mounting structures, each configured for securing thereto a rotor blade, wherein use is made of a vessel that is provided with a crane having a load connector suspended from one or more winch driven cables of the crane, wherein a blade lifting tool that is attached to the load connector is engaged with a rotor blade in horizontal orientation, which rotor blade has a blade body with a blade root, a blade tip, a length, and a rotor blade mass, wherein the blade root has an exterior and is configured to be secured in a mounting position of the blade root to a blade mounting structure of the hub of the offshore wind turbine by means of one or more fasteners, wherein the crane is operated to lift the rotor blade whilst remaining in horizontal orientation to a height that is substantially level with a blade mounting structure of the offshore wind turbine, wherein use is made of a blade motion synchronization and positioning device, which device comprises:
  a wind turbine coupler, that is configured to releasably couple the device to the wind turbine,
  a blade coupler, e.g. integrated with the blade lifting tool, that is configured to releasably couple the device to the rotor blade,
  a motion arm between the wind turbine coupler and the blade coupler,
  a controllable motion arm actuator assembly comprising one or more actuators associated with the motion arm and a controller, the assembly being configured to provide controlled motion of the motion arm, wherein the tower top is subject to sea state and/or wind induced tower top motion in at least one direction in a horizontal plane, wherein the blade coupler is initially coupled to the rotor blade, wherein the method comprises:
  with the rotor blade suspended from the crane, substantially level with a blade mounting structure of the hub of the wind turbine, and with the blade coupler being coupled to the blade and with the wind turbine coupler still detached from the wind turbine-operating the controllable motion arm actuator assembly so as to gradually bring, and then maintain, the wind turbine coupler in a motion compensated pre-coupling position thereof that is spaced from the wind turbine and in a horizontal motion that is synchronized with the tower top motion,
  possibly simultaneously with said synchronization, operating the controllable motion arm actuator assembly to displace the wind turbine coupler from said pre-coupling position towards the wind turbine and then coupling the wind turbine coupler to the wind turbine, wherein-when coupled—the blade root is in a pre-mounting position that is spaced from the blade mounting structure of the hub of the wind turbine,
  operating the controllable motion arm actuator assembly to perform a mounting motion wherein the blade root is moved from the pre-mounting position into the mounting position, and keeping the blade root in the mounting position during fastening of the blade root to the mounting structure by one or more fasteners.

It will be appreciated that the above alternative methods also achieve the objectives stated in the introduction. The mass of the device is now carried by the crane as well, e.g. the device being coupled to the blade root ahead of lifting the rotor blade up to a height substantially level with the mounting structure of the hub. In view of the already sizable mass of the blade, the extra mass of the device may well be acceptable in practice, e.g. depending on the design of the crane. In embodiments, the device is integrated with and/or coupled to the blade lifting tool, e.g. to an extender of the blade lifting tool. The blade lifting tool will, in many practical embodiments, engage (e.g. clamp) the rotor blade near the center of mass thereof, with the inventive device extending from said location along the length of the rotor blade to, and preferably beyond, the blade root.

The alternative method may involve that once the blade is properly installed, the device is disengaged from the blade, e.g. first connected to the crane (which has already been disengaged from the blade) and then disengaged from the blade and subsequently lowered, e.g. for connecting to the next blade to be installed.

The invention also relates to the blade motion synchronization and positioning device configured for use in this alternative method.

The invention also envisages an approach, wherein use is made of a system that includes two motion arm devices, each having a motion arm. Herein the one device is initially coupled to the wind turbine and the other device is initially coupled to the blade. Each device has a motion arm between its respective wind turbine coupler or blade coupler on the one hand, and an associated motion arm coupler on the other hand. These motion arm couplers are configured to interlock with one another, so as to effectively create a motion compensating motion arm system between the wind turbine and the rotor blade that allows for the mounting operation of the rotor blade as discussed herein.

For example, this approach envisages a method for installation of a rotor blade in horizontal orientation to the hub of a horizontal axis offshore wind turbine that is located offshore, wherein the offshore wind turbine comprises:
- a foundation,
- a tower mounted on the foundation and having a tower top,
- a nacelle on the tower top, the nacelle being provided with
  - a horizontal axis hub having multiple blade mounting structures, each configured for securing thereto a rotor blade, wherein use is made of a vessel that is provided with a crane having a load connector suspended from one or more winch driven cables of the crane, wherein a blade lifting tool that is attached to the load connector is engaged with a rotor blade in horizontal orientation, which rotor blade has a blade body with a blade root, a blade tip, a length, and a rotor blade mass, wherein the blade root has an exterior and is configured to be secured in a mounting position of the blade root to a blade mounting structure of the hub of the offshore wind turbine by means of one or more fasteners, wherein the crane is operated to lift the rotor blade whilst remaining in horizontal orientation to a height that is substantially level with a blade mounting structure of the offshore wind turbine, wherein use is made of a blade motion synchronization and positioning system, which system comprises:
- a wind turbine motion arm device, which device comprises:
  - a wind turbine coupler, that is configured to releasably couple the device to the wind turbine,
  - a first motion arm coupler,
  - a first motion arm between the wind turbine coupler and the first motion arm coupler,
  - a first controllable motion arm actuator assembly comprising one or more actuators associated with the first motion arm and a controller, the assembly being configured to provide controlled motion of the first motion arm,
- a rotor blade motion arm device, which device comprises:
  - a blade coupler, e.g. integrated with the blade lifting tool, that is configured to releasably couple the device to the rotor blade,
  - a second motion arm coupler,
  - a second motion arm between the blade coupler and the second motion arm coupler,
  - a second controllable motion arm actuator assembly comprising one or more actuators associated with the second motion arm and a controller, the assembly being configured to provide controlled motion of the second motion arm, wherein the tower top is subject to sea state and/or wind induced tower top motion in at least one direction in a horizontal plane, wherein the method comprises:
- coupling the wind turbine motion arm device to the wind turbine and coupling the rotor blade motion arm device to the rotor blade,
- suspending the rotor blade from the crane, substantially level with a blade mounting structure of the hub of the wind turbine,
- operating the first motion arm and/or the second motion arm so as to bring and maintain the first and second motion arm couplers in a pre-interlocking position and in a synchronized motion, so that the motion arm couplers are substantially stationary relative to one another in said pre-interlocking position,
- operating the first and/or second controllable motion arm actuator assembly to displace the first and second motion arm couplers from said pre-interlocking position towards one another and then interlocking the first and second motion arm couplers,
- with the first and second motion arm couplers being interlocked-operating the first and/or second controllable motion arm actuator assembly so as to gradually bring, and then maintain, the rotor blade, e.g. the blade root, in a horizontal motion that is synchronized with the tower top motion, and
- possibly simultaneously with said synchronization, operating the first and/or second controllable motion arm actuator assembly to displace the blade root of the coupled blade towards the blade mounting structure into a pre-mounting position,
- operating the first and/or second controllable motion arm actuator assembly to perform a mounting motion wherein the blade root is moved from the pre-mounting position into the mounting position, and keeping the blade root in the mounting position during fastening of the blade root to the mounting structure by one or more fasteners.

This approach also envisages a blade motion synchronization and positioning system, which system comprises:
- a wind turbine motion arm device, which device comprises:
  - a wind turbine coupler, that is configured to releasably couple the device to the wind turbine,
  - a first motion arm coupler,
  - a first motion arm between the wind turbine coupler and the first motion arm coupler,
  - a first controllable motion arm actuator assembly comprising one or more actuators associated with the first motion arm and a controller, the assembly being configured to provide controlled motion of the first motion arm, a rotor blade motion arm device, which device comprises:
- a blade coupler, e.g. integrated with the blade lifting tool, that is configured to releasably couple the device to the rotor blade,
- a second motion arm coupler,
- a second motion arm between the blade coupler and the second motion arm coupler,
- a second controllable motion arm actuator assembly comprising one or more actuators associated with the second motion arm and a controller, the assembly being configured to provide controlled motion of the second motion arm.

This approach also envisages the use of the above system for the installation of a rotor blade, e.g. in horizontal orientation, to the hub of a horizontal axis offshore wind turbine, e.g. that is located offshore.

In an embodiment, the rotor blade motion arm device is coupled to or integrated with a blade lifting tool by means of which the rotor blade is hoisted using a crane.

Figure 7:
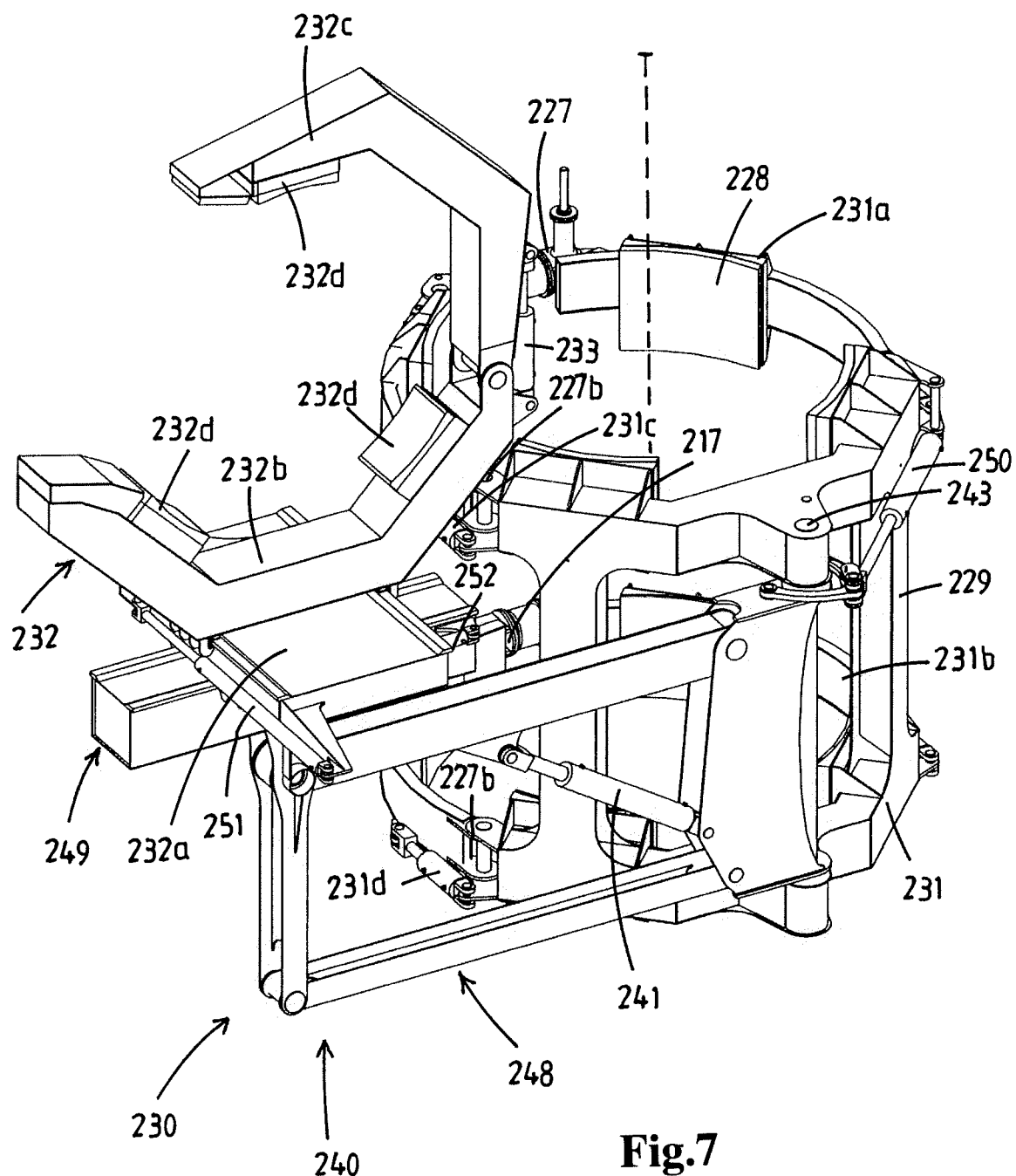
Figure 8:
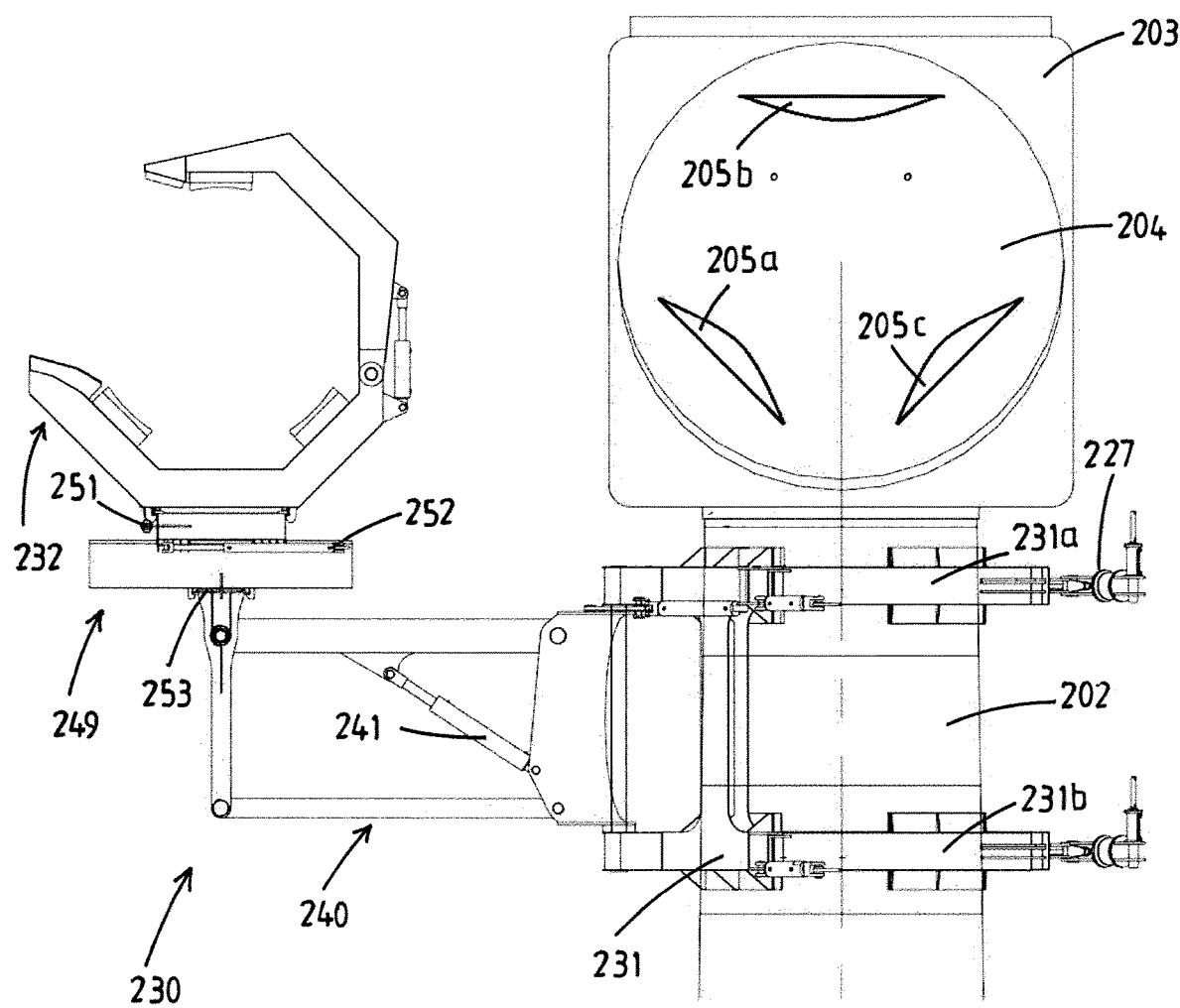

The invention will now be discussed with reference to the drawings. In the drawings:

FIG. 1 shows schematically, in a view onto the front of the nacelle, the top of an offshore wind turbine with the inventive blade motion synchronization and positioning device which has been used in the installation of a rotor blade, FIG. 2 shows schematically, in a view from above, the use of the inventive blade motion synchronization and positioning device in the installation of the blade, FIG. 3 is a close-up of FIG. 2, FIG. 4 illustrates the coupling of the device to the mast of the wind turbine, FIGS. 5*a-f* illustrates the operation and use of the blade root gripper of the device of FIGS. 1-4, FIGS. 6 *a-f* illustrate details of the device of FIGS. 1-5, FIG. 7 illustrates an alternative embodiment of the blade motion synchronization and positioning device, FIG. 8 shows the embodiment of the FIG. 7 as seen from the side, FIGS. 9*a*-9*j* show schematically, as seen from above, the rotation of the motion arm of the blade motion synchronization and positioning device of FIG. 7 from one side of the nacelle towards the other side of the nacelle in two different configurations, FIGS. 10*a*-10*d* show schematically, in a side view, the release of the device of FIG. 7 from the blade that has been fastened to the hub.

Figures 14A, 14B:
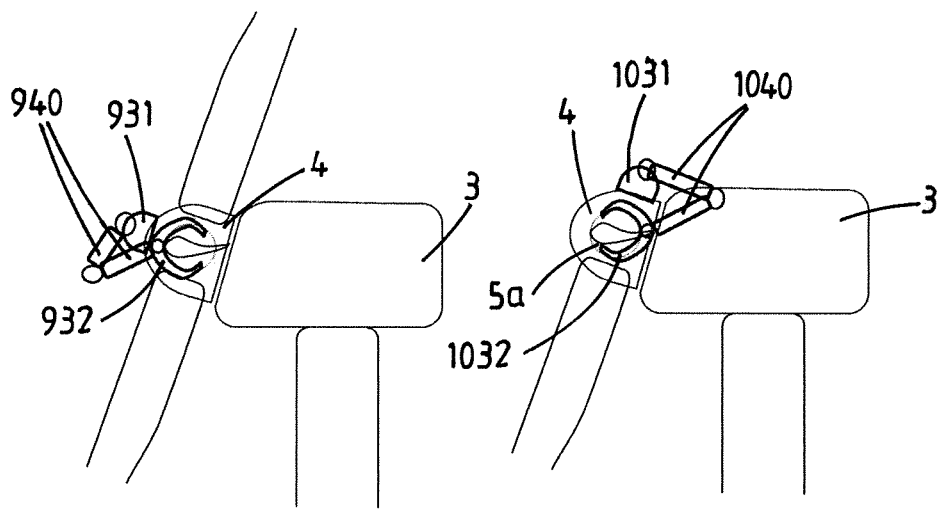
Figures 14C, 14D:
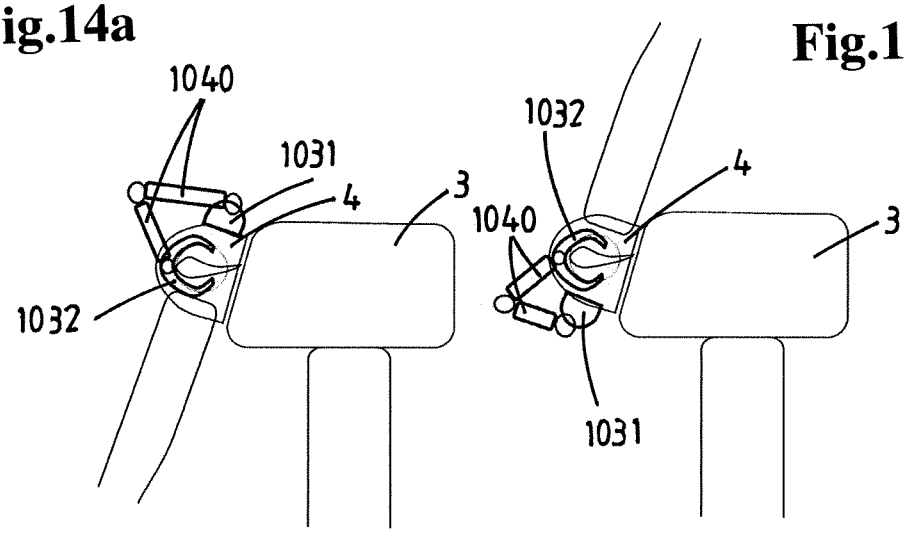
Figure 15:
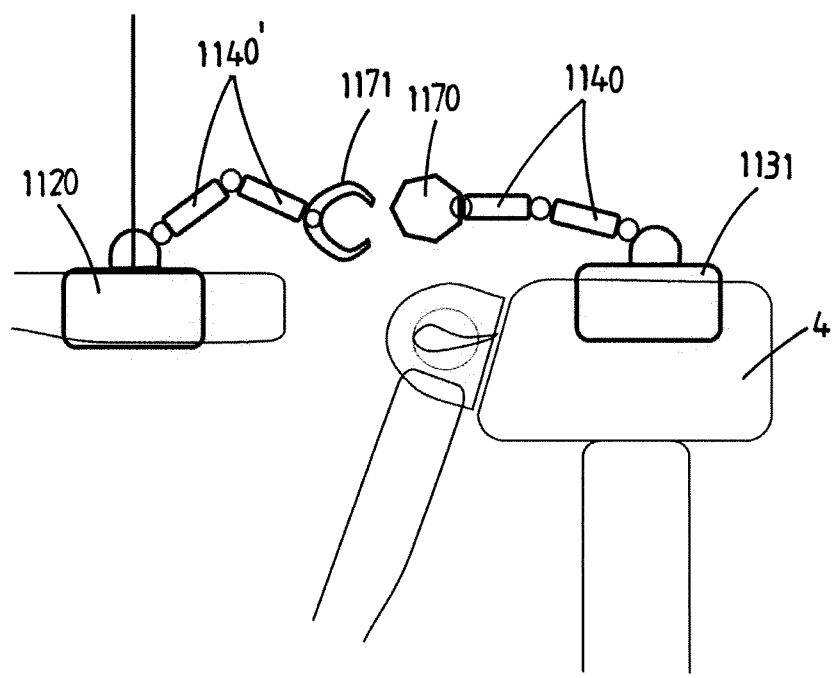

FIGS. 11*a-d* show schematically an alternative embodiment of the blade motion synchronization and positioning device and wind turbine coupler being coupled to the nacelle, e.g. by utilizing hard points on the nacelle, FIGS. 12*a-f* show schematically several alternative embodiments of the blade motion synchronization and positioning device wherein the wind turbine coupler is coupled to the nacelle in various positions and forms, FIGS. 13*a*-13*c* show schematically yet another alternative embodiment of the wind turbine coupler being coupled to the nacelle, FIGS. 14*a-d* show schematically several instances of an alternative embodiment of the blade motion synchronization and positioning device wherein the wind turbine coupler is coupled to the horizontal axis hub of the wind turbine, FIG. 15 shows schematically an embodiment of the blade motion synchronization and positioning device wherein a secondary motion arm is utilized, one arm mounted to the wind turbine and a secondary arm mounted to the blade lifting tool, FIG. 16 shows schematically the implementation of a hub connection member and pitch bearing integrated with a wind turbine blade before it has been mounted to the wind turbine.

In FIG. 1 a top portion of an offshore wind turbine is schematically shown. The wind turbine comprises:
- a foundation (not shown), e.g. fixed to the seabed, e.g. a monopile or a jacket,
- a tower 2 that is mounted on the foundation and has a tower top shown in FIG. 1,
- a nacelle 3 on the tower top, the nacelle 3 being provided with a horizontal axis hub 4 having multiple blade mounting structures 5*a,b,c*, each configured for securing thereto a rotor blade 6, 7, 8.

As is known in the art, the mounting structures 5*a,b,c* may each include a pitch bearing, allowing to adjust the pitch of the blades by means of a pitch mechanism.

As is known in the art, the rotation of the hub causes a generator to generate electricity.

In FIG. 1 all three blades 6, 7, 8 have already been installed to the horizontal axis hub 4.

In the installation of the blades 6, 7, 8, also as known in the art, use has been made of a vessel, that is provided with a crane having a load connector suspended from one or more winch driven cables of the crane, wherein a blade lifting tool 20 that is attached to the load connector is engaged with a rotor blade 8 in horizontal orientation. The FIG. 3 illustrates that the centre of gravity (COG) of the blade 8 is located within the area where the tool 20 holds the blade 8.

Each rotor blade, like blade 8, has a blade body with a blade root 8*a*, a blade tip, a length, and a rotor blade mass. The blade root 8*a* has an exterior and is configured to be secured in a mounting position of the blade root 8*a* to a blade mounting structure 5*c* of the hub of the offshore wind turbine by means of one or more fasteners, e.g. bolts 10 protruding from the root as is known in the art. For example, the structure 5*c* has bolt holes into which the bolts are to be introduced, after which nuts are secured on the bolts.

The crane is operated to lift the tool 20 and thereby the rotor blade 8, e.g. from a deck and/or a storage rack of the vessel, or from a barge, whilst remaining in horizontal orientation to a height that is substantially level with a blade mounting structure 5*c* of the offshore wind turbine.

The blade mounting structure 5*c* to which the blade 8 is installed, is oriented horizontally, so in the 3 o'clock or 9 o'clock position.

The figures illustrate that use is made of a blade motion synchronization and positioning device 30, which device comprises:
- a wind turbine coupler 31, that is configured to releasably couple the device to the wind turbine,
- a blade coupler, here a blade root coupler 32 that is configured to couple to the exterior of the blade root 8*a*,
- a motion arm 40 between the wind turbine coupler and the blade coupler,
- a controllable motion arm actuator assembly comprising one or more actuators 50, 51, 52 associated with the motion arm and a controller 60, the assembly being configured to provided controlled motion of the motion arm, It is illustrated that the wind turbine coupler 31 is coupled to the wind turbine, in more detail to the top of the tower 2 just below the nacelle 3. For example, as shown here, the coupler 31 is configured to clamp around the tower, here at two levels by two clamping mechanisms 31*a, b.*

As the wind turbine is installed at sea, the tower top is subject to sea state and/or wind induced tower top motion in at least one direction in a horizontal plane, e.g. as discussed in detail in the documents referred to in the introduction.

The illustrated motion arm 40 is an articulated motion arm having multiple interconnected arm segments including an inner arm segment 41 that is connected to the coupler 31 and an outer arm segment 42 that carries the blade coupler 32.

The inner arm segment 41 is connected via a z-axis hinge 43 to the coupler 31. In this embodiment, the coupler 31 has a vertically adjustable coupler member 31c, here guided on a vertical beam 31d of the coupler frame, and an associated height adjustment actuator 31e allowing to set the height of the arm 40, and thereby the blade root coupler 32. The inner arm segment 41 is connected via vertical axis hinge 43 to this coupler member 31c.

The arm segments 41, 42 are connected to one another via a Z-axis hinge 44.

The arm segments 41, 42 are rigid arm segments having a fixed length, in this example.

For controlled (pivotal) motion of the arm segment 41 relative to the coupler 31 an actuator 50 is provided.

For controlled (pivotal) motion of the arm segment 42 relative to the arm segment 41 an actuator 51 is provided.

The blade root coupler 32 is carried on the outer arm segment 42 of the motion arm so as to be pivotal relative to the motion arm at least about a Z-axis swivel pivot 45, e.g. freely pivotal or provided with a damping arrangement, allowing for sway motion of rotor blade 8 suspended from the crane about the Z-axis swivel when coupled to the blade root coupler 32. As a result, the coupler 32 is movable in the horizontal plane, in two non-parallel directions, relative to the tower top.

It is illustrated that the blade root coupler 32 is an openable gripper that is configured to grip about the blade root 8a.

The gripper has a gripper base 32b that is connected to the motion arm, via the Z-axis swivel 45, and the gripper has one or more pivotal gripper jaws 32c, e.g. one at each circumferential end of the gripper base 32b.

It is illustrated, as an example, that the gripper base 32 not only is hinged about vertical swivel 45 but also about a horizontal swivel axis 46. To this end, the coupler 32 includes a subframe 32a between the arm, here segment 42 via swivel 45 and the base 32b. The subframe 32a swivels about the axis 45 and the base 32b swivels about the horizontal axis 46 relative to the subframe 32a. For example, an actuator 46a controls the swivel motion of the base 32a about the horizontal (swivel) axis 46. Similarly, an actuator 52 controls the swivel motion about the vertical axis 45.

In FIG. 1 the gripper 32 has been opened as the blade 8 has been properly installed already.

Figure 5F:
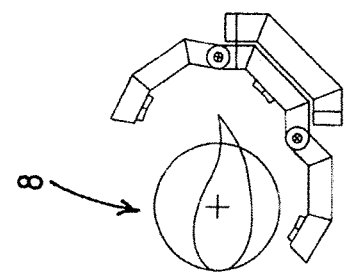
Figure 5E:
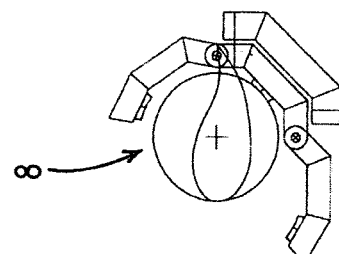
Figure 5D:
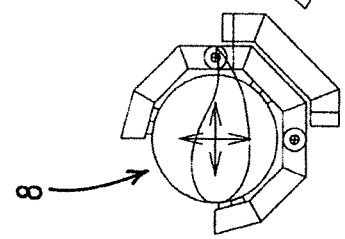
Figure 5C:
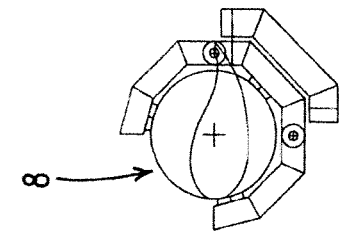
Figure 5B:
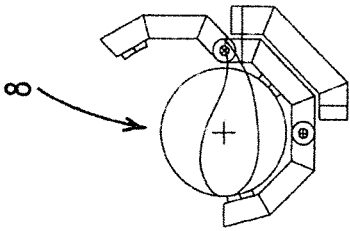
Figure 5A:
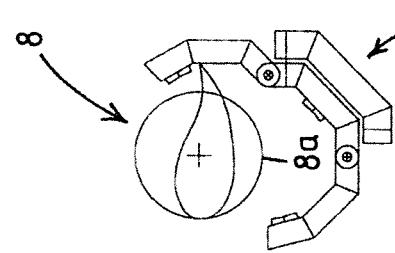

Generally, as shown in FIGS. 5a,b, c the gripper 32 can be opened so that the coupling of the blade root 8a comprises resting the blade root on the gripper base 32b, here also on one of the jaws 32c, and then closing the gripper by actuation of the one or more pivotal gripper jaws 32c.

The installation of the blade 8 to the hub 4 comprises:
operating the controllable motion arm actuator assembly 50, 51, 52, 60 to bring and maintain the blade coupler 32 in a motion compensated receiving position thereof, e.g. as in FIG. 2 or somewhat outwards thereof, wherein the motion arm 40 is operated to compensate for the tower top motion,
coupling the blade coupler 32 in said receiving position thereof to the rotor blade, here to the blade root 8a of the rotor blade, that is suspended from the crane, substantially level with a mounting structure 5c of the hub of the wind turbine,
with the blade coupler 32 being coupled to the blade root 8a—operating the controllable motion arm actuator assembly 50, 51, 52, 60 so as to gradually bring, and then maintain, the coupled blade, e.g. the blade root 8a, in a horizontal motion that is synchronized with tower top motion, and
possibly simultaneously with said synchronization, operating the controllable motion arm actuator assembly 50, 51, 52, 60 to displace the blade root 8a of the coupled blade into a pre-mounting position (pm, see FIG. 2) that is closer to the mounting structure 5c than the receiving position,
operating the controllable motion arm actuator assembly 50, 51, 52, 60 to perform a mounting motion wherein the blade root 8a is moved from the pre-mounting position pm into the mounting position (see FIG. 3), and keeping the blade root 8a in mounting position during fastening of the blade root to mounting structure 5c by one or more fasteners 10.

It is noted that FIG. 3 also shows the retracted position of the arm 40.

In an embodiment, the synchronization with the tower top motion is effected prior to displacing the blade root 8a of the coupled blade into the pre-mounting position by means of operation of the arm 40.

In an embodiment, the method comprises a verification step that is performed with the blade root 8a in the pre-mounting position pm and prior to initiating the mounting motion, here in axial direction of the blade 8 as defined by the extension of the bolts 10 and their introduction into bolt holes of the mounting structure 5c, which verification step comprises verification of the synchronization and/or alignment of the blade root with the mounting structure. Verification may entail the use of one or more position detectors, e.g. contactless, e.g. from nacelle to blade root, e.g. a camera, a radar, infrared distance measuring, and/or satellite based position sensing, etc.

As is preferred, in an embodiment, the crane has a boom, and the crane is provided with a load connector active position control system that is configured and operated to actively control the position of the load connector in at least one horizontal direction, preferably two non-parallel horizontal directions, relative to the boom, wherein the method comprises operating the load connector active position control system in synchronicity with the blade coupler 32, e.g. the blade root coupler when coupled to the exterior of the blade root 8a. Examples of suitable cranes have been listed above.

In embodiment, the blade lifting tool 20 comprises a frame 21 that is attached to the load connector of the crane, wherein the blade lifting tool comprises a blade holding assembly 22 that is mobile mounted relative to the frame, e.g. at least mobile relative to the frame in one horizontal direction, e.g. along a length of the rotor blade 8 held by the blade holding assembly, preferably two non-parallel horizontal direction, and wherein the blade lifting tool comprises a controllable motion actuator device 23 between frame and blade holding assembly. In an embodiment, the method comprises operating the controllable motion actuator device 23 to move the blade holding assembly 22 relative to the frame 21 in synchronicity with the blade coupler 32 when coupled to the blade 8 as discussed.

Preferably, use is made of one or more sensors that measure the distance and/or position and/or angular orientation of the blade root 8a relative to the mounting structure, e.g. said one or more sensors being linked to the controller 60 of the controllable motion arm actuator assembly and/or to load connector active position control system and/or to the controllable motion actuator device 23 that moves the blade holding assembly 22 relative to the frame 21 of the blade lifting tool 20.

For example, the method comprises the use of a control unit for control of the motion arm 40, e.g. said control unit being operated by a human operator present in the nacelle 3.

FIG. 2 illustrates that after completion of fastening of the rotor blade 8 to the hub of the offshore wind turbine, the blade coupler 32, e.g. blade root coupler, is released from the blade root 8a and the motion arm 40 is then operated to move into a retracted configuration wherein a clearance is provided for the installed rotor blade during a rotation of the hub that is done so as to bring another one of the mounting structures into position for the installation of another rotor blade to the offshore wind turbine.

As discussed, the method may comprise an emergency distancing routine, e.g. programmed into controller 60, wherein the motion arm 40 is operated to cause a rapid distancing of blade root away from nacelle, e.g. in case of a power and/or control signal anomaly and/or in case of an anomaly in wind condition and/or sea state.

As discussed, when the blade 8 is suspended from a crane by means of the lifting tool 20, even when other measures are present to counter motion of the blade like tugger lines, etc, still some (residual) motion of the rotor blade may be present. For example, in horizontal plane oscillating sway of the rotor blade about Z-axis through load connector of the crane is often observed. Other motions are in vertical plane oscillations about a horizontal axis, usually at the point of suspension of the lifting tool 20 from the crane, in plane X-motion of the blade along length of rotor blade, and/or in plane Y-motion transverse to length of rotor blade. The motion is often a motion induced by wind, but due to the enormous mass of the blade as well as length of the crane boom required for the installation, crane motions (e.g. boom vibrations) are also a factor. This motion of the blade 8 may be the cause of undesirable loads/stress on the arm 40, the coupler 32, and/or the location where the coupler engages the blade 8, e.g. at the root. In this regard, the provision of a swivelling support of the coupler 32 relative to the arm 40 alleviates or reduces this issue.

As mentioned in the cited documentation, the wind direction may be the same as the wave direction, yet they may also differ and not-coincide, e.g. waves still being in a direction of earlier strong wind that has reduced in force and changed direction. The illustrated device 30 allows to effectively deal with such situations as well. As mentioned in the cited documentation, the periodic tower top motion may have a significant amplitude, e.g. more than 0.5 meter, even more than 1 meter. Given the accuracy needed to introduce the multitude of bolts 10 in their bolt holes, the use of the arm 40 is highly effective and at least enlarges the operational window for the blade installation over prior art approaches. As discussed, collision of the bolts 10 may cause damage to the bolts and/or to structure of blade root, e.g. of the composite material, e.g. in the form of internal cracks.

The bolts 10 may be T-bolts as is known in the art. Other fasteners may be used as well.

The advancing of the blade 8 by means of the arm 40 in the installation process, may be accompanied by a corresponding operation of the crane, e.g. so that the point of suspension from the crane follows the motion governed by the arm. For example, the crane follows this motion primarily by slewing of the boom about a vertical slew axis, and/or by operation of a load connector position control system for x-y (possibly also-z) control of position of load connector that carries the blade lifting tool 20.

The vessel on which the crane is mounted could be in a floating condition, but could also be a jack-up vessel so that the crane is not subject to hull motion. The crane may also be stabilized, e.g. mounted on a motion stabilized platform onboard a floating vessel.

In an embodiment, an optical (e.g. laser based) guidance system is provided that is used for control of the path of the blade coupler relative to mounting structure to which the blade is to be installed.

In an embodiment, the blade root coupler 32 frictionally couples to the exterior of the blade root, e.g. as the root is clamped by the gripper, e.g. by friction pads, e.g. pneumatic friction pads. Coupling to the blade, e.g. blade root, may also involve the use of vacuum, magnetic forces, etc.

In an embodiment, a load connector position control system of the crane is operated to bring and maintain the blade longitudinal axis in alignment with mounting axis, so with the direction of the bolts 10 when present, preferably when in stationary receiving position, and/or when moving to pre-mounting position, or when in mounting position.

In an embodiment, an angle sensing assembly is present to detect angle between the mounting axis and the longitudinal axis of blade, e.g. between blade root coupler and motion arm, e.g. the outer segment of the arm, in horizontal plane.

In the blade root coupler 32 there may be, as indicated in FIG. 5d, blade root engaging members that are resiliently mounted and/or associated with positioning devices, e.g. allowing to adjust to coupler 32 to transverse dimensions of the blade, e.g. to the diameter of the blade root.

FIGS. 5e and f illustrate that-after fastening blade root to mounting structure—the blade root coupler 32 is opened and disengaged from blade root, involving moving the arm to the retracted position thereof so that hub can be rotated to bring a further mounting structure in the horizontal position for installation of the next blade to the hub.

FIGS. 7, 8, 9a-j, 10a, 10b, 10c and 10d show an alternative embodiment of the blade motion synchronization and positioning device 230.

FIG. 7 shows the alternative embodiment of the blade motion synchronization and positioning device 230. The tower, nacelle and blades are not shown.

The wind turbine coupler 231 (or tower coupler) here is embodied with an annular clamping assembly comprising a lower and an upper clamping mechanism 231a, 231b.

The clamping mechanisms each comprise one or more actuators 231c, 231d, here embodied as hydraulic cylinders.

The upper and lower clamping mechanisms 231a, 231b are connected through a frame comprising one or more vertical members 229 coupling the upper and lower clamping mechanisms.

Each clamping mechanism 231a, 231b is provided, as preferred, with two or more clamping pads 228 which when clamped frictionally engage with the exterior of the tower, not shown.

The clamping mechanisms are here each configured to open up at a respective clamp lock 227 and to pivot around hinge 227b allowing the clamping mechanisms to be placed around the tower such that the main axis of the tower aligns with axis T before pivoting back, and engaging and locking the clamp locks 227 again.

After this placement of the clamping mechanisms around the tower, the actuators 231c and 231d assist in engaging of the clamping mechanisms with the tower.

The blade coupler or blade root coupler is seen in FIG. 7 to be embodied as a gripper 232 comprising two segments. One segment is the gripper base 232b and the other is a pivotal gripper jaw 232c. Both of the segments of the gripper 232 comprise one or more gripping pads configured to engage with the blade without damaging the blade.

The opening and closing of the gripper, here by pivoting jaw 232c, is assisted by a gripper actuator 233 of the gripper 232.

The motion arm 240 connecting and providing motion between the wind turbine coupler 231 and the blade coupler 232 illustrated in FIG. 7 comprises a parallelogram mechanism 248 that acts in a vertical plane and of a motion stage, here an X-Y-θ stage 249.

The parallelogram or four-bar-linkage mechanism 248 of the motion arm 240 forms an inner segment of the arm and, as preferred, is connected to the wind turbine coupler via a vertical axis hinge 243. The mechanism 248 can be rotated or swivelled about this hinge 243 by an actuator 250.

A motion stage, here a X-Y-θ stage 249, is mounted on the end of the parallelogram mechanism 248 remote from the tower. The blade coupler or gripper 232 is mounted on the stage.

In addition to small rotational movements to compensate for blade synchronisation and positioning the rotation allows for half a revolution around this vertical axis hinge 243, thus enabling the X-Y-θ stage 249 and the blade coupler 232 to move from one side of the nacelle to the opposite side of the nacelle.

This ability of the parallelogram mechanism 248 to rotate at least 180 degrees can be used (in conjunction with the rotation of the blade coupler 232 by means of the X-Y-θ stage 249) to position and place a blade on either side of the nacelle.

Blade motion synchronization, positioning and placement on either side of the nacelle can, using this device 230, be executed without having to reposition or re-attach the wind turbine coupler 231 to the tower.

The height adjustment actuator 241 of the parallelogram mechanism is configured to move up and down the remote end of the mechanism and the stage, here the X-Y-θ stage 249, and subsequently the blade root coupler 232 and blade, if present.

The height adjustment actuator 241 also provides a brace within the parallelogram mechanism 248 such that in the unactuated state of this actuator the X-Y-θ stage 249 sinks but is stopped by the limited range of motion of the actuator 241. This brace limit can be implemented as a safety measure to prevent damage to the stage, gripper, and blade.

The X-Y-θ stage 249 is configured for moving and/or rotating the blade coupler 232 in order to provide for the motion compensation and synchronization of the gripped blade as discussed herein.

The X and Y movements of the gripper 232 on the stage 249 are actuated using orthogonal linear actuators 251, 252 while the rotational θ movement is integrated with the stage which although not visible from FIG. 7 can be seen in FIG. 8 to rotate or swivel at the base of the stage 249 where it connects to the parallelogram mechanism 248.

In an alternative embodiment, this θ rotational component could also be incorporated in between the blade coupler 232 and the top part of the stage 249.

In an alternative embodiment, this θ rotational component could also be incorporated in between the X and Y part of the stage 249.

This rotation of the blade coupler 232 may, in conjunction with the rotation of the parallelogram mechanism 248 of the motion arm 240 around the vertical axis hinge 243, be used to rotate a blade gripped in the blade coupler 232 around the nacelle while keeping the blade root pointing towards the nacelle. This rotation is allowable for as far as the blade lifting tool and the crane can support the blade during this rotation.

The blade motion synchronization and positioning device 230 can also function without the rotational component of the X-Y-θ stage 249 and therefore be outfitted with an X-Y stage 249 instead.

Compared to the preceding embodiment of the blade motion synchronization and positioning device, this embodiment does not make use of a rotation around a swivel axis 46 as seen in FIG. 1. It is noted that the stage may allow for exchange of the blade coupler for a version which does enable this motion.

The implementation of the X-Y-θ stage 249 or X-Y stage 249 allows for decoupled motion and control in the X and Y direction as well as the rotation θ. This decoupled motion can be advantageous for the mounting motion, wherein the blade root is moved from the pre-mounting position pm into the mounting position, since the majority of the movement can then be performed by an actuator in a single direction whilst the rest of the actuators can be used for relatively small compensating motions as compared to the mounting motion.

FIG. 8 shows a side view of the same alternative embodiment of the blade motion synchronization and positioning device 230 shown in FIG. 7.

In FIG. 8, the wind turbine coupler 231a,b is shown to be clamped around the tower 202 under and near the nacelle 203. No blades are yet secured to the blade mounting structures 205a,b,c of the horizontal axis hub of the nacelle 203.

In FIG. 8, the rotational capability 253 of the X-Y-θ stage 249 can be better observed to reside at the interface of the parallelogram mechanism 248 and the stage 249.

FIGS. 9a, 9b, 9c, 9d, and 9e illustrate, in a schematic view from above, the rotation of the motion arm of the blade motion synchronization and positioning device around the vertical hinge axis 243 towards the other side of the nacelle 203, here illustrated without a blade.

The same process of rotation of the blade motion synchronization and positioning device around the vertical hinge axis 243 towards the other side of the nacelle 203 illustrated without the blade present during this rotation and without the stage of the motion arm of the blade motion synchronization and positioning device possessing the θ rotational capability can be imagined by just making use of FIGS. 9a and 9e without FIGS. 9b,9c and 9d.

FIGS. 9f, 9g, 9h, 9i and 9j illustrate the same process of rotation of the blade motion synchronization and positioning device around the vertical hinge axis 243 while the nacelle 203 is in another starting position with respect to the wind turbine coupler.

This alternate starting position of the nacelle 203 also logically changes the starting position of the vertical hinge axis 243 with respect to the nacelle 203.

Here the stage of the motion arm of the blade motion synchronization and positioning device is also illustrated without possessing the θ rotational capability.

With this alternate starting position of the nacelle 203 with respect to the wind turbine coupler it becomes apparent from FIGS. 9*hm* 9*i* and 9*j* that an extra counter rotation of the nacelle 203 is required with respect to the blade motion synchronization and positioning device to be able to reach the opposite side of the nacelle.

It should then also become clear that in this alternate starting position case, although possible without, it is desirable for the stage of the motion arm of the blade motion synchronization and positioning device to possess the θ rotation capability.

This way, it is for instance possible to bring a blade held by the blade motion synchronization and positioning device to the opposite side of the nacelle 203, without having to remove the blade and replace it in its correct orientation, by applying a counter rotation θ to the rotation around the vertical hinge axis 243.

FIGS. 10*a*, 10*b*, 10*c* and 10*d* illustrate the sequence of releasing the blade after its fastening to the corresponding mounting structure involving the opening of the blade coupler 232 and height adjustment of the parallelogram mechanism 248 to move the coupler away from the blade.

In FIGS. 10*a* and 10*b* the blade coupler 232 can be seen to release its grip upon the blade and move away from the blade. This moving away here is accomplished by utilising the parallelogram mechanism 240 as well as the stage motion.

Figures 10C, 10D:
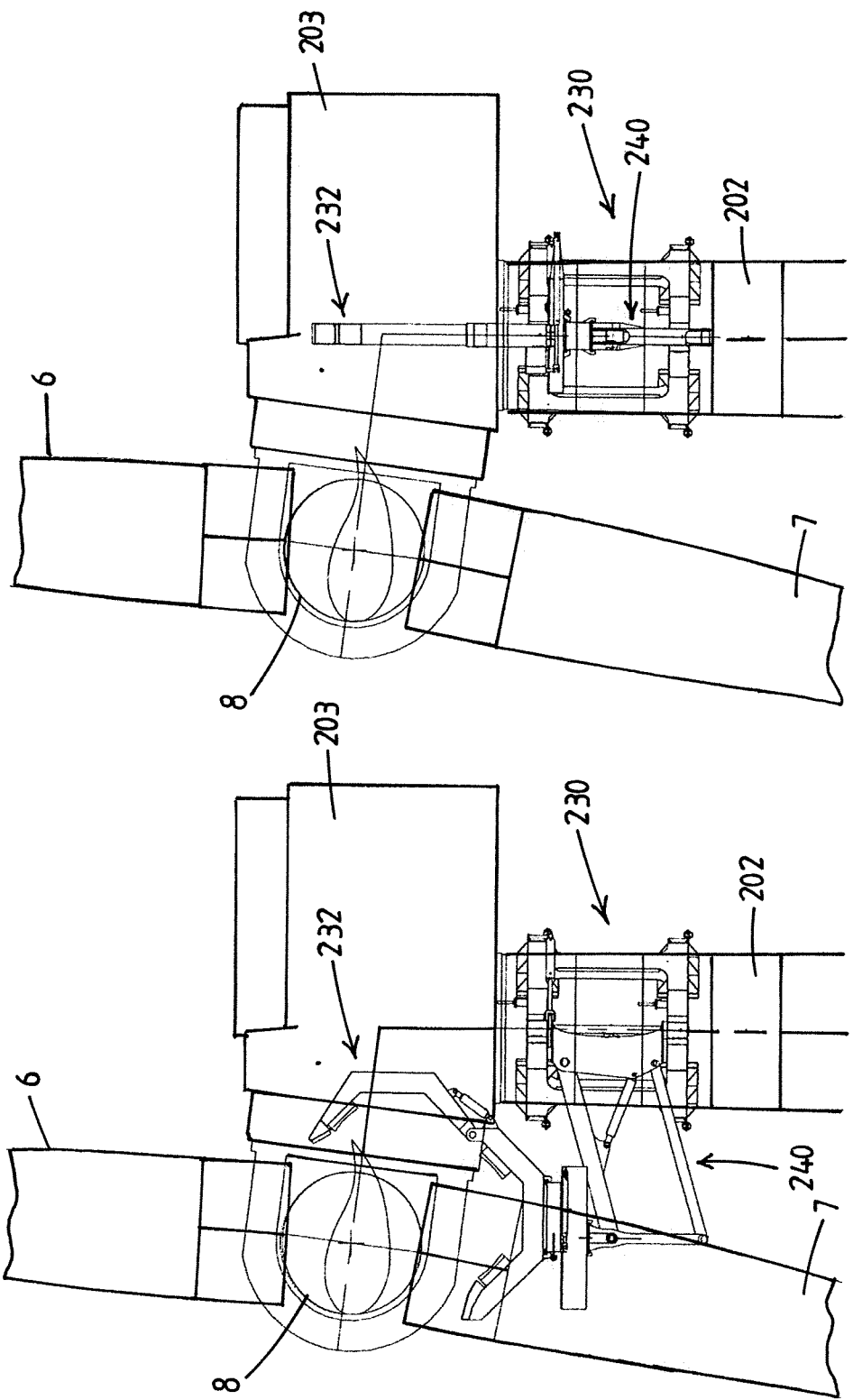

In FIGS. 10*c* and 10*d* the blade synchronization and positioning device can be seen to further move away from the blade and to then rotate around the vertical hinge axis 243.

After rotating the motion arm and blade coupler 232 away from the fastened blade, here involving a rotation or swivel motion of inner arm segment 240 about the vertical hinge axis 243, it is possible to rotate the hub with the blade(s) without the blade motion synchronization and positioning device 230 obstructing this rotation. This rotation can be to a new configuration for accepting placement of another blade onto one or more of the blade mounting structures 205*a*, 205*b*, 205*c*, preferably over a rotation angle of 120 degrees such that it can then once again be aligned with the blade motion synchronization and positioning device.

In an embodiment, use is made of a sensing assembly for sensing spatial motion of blade root, e.g. inertia-based sensing assembly, e.g. only in horizontal plane, e.g. two non-parallel directions, e.g. length and transverse to length, rotation about Z-axis of load connector, rotation about Y-axis through load connector, all oscillations.

As discussed, a mass damper may be provided as part of the tower (e.g. permanently installed or temporary installed). A mass damper may also be provided as part of or in combination with the device 30, 230, e.g. integrated with tower coupler 31, 231 so as to (temporarily) reduce tower motion.

For example, a gyroscopic stabilizer is provided in the device 30, 230 e.g. integrated with blade root coupler 32, e.g. stabilizing blade root coupler and coupled blade about z-axis swivel of blade root coupler.

For example, a gyroscopic stabilizer is present in the blade lifting tool 20 and/or load connector of the crane, e.g. on a spreader from which the tool 20 is suspended.

In an embodiment, the blade coupler comprises one or more slings, e.g. with one or more sling adjuster devices, configured to each be engaged with a circumferential portion of the blade, e.g. of the blade root, e.g. the blade root being gradually tightened between multiple slings to couple the blade root.

In an embodiment, a temporary collar member is fitted releasably on blade root prior to lifting by crane and configured to be engaged by blade root coupler 32, and to be removed after completion of blade installation, e.g. disengaged from blade root whilst remaining engaged with the blade root coupler and later removed by crane, e.g. to be fitted on next blade.

In an embodiment, means are provided to cause communication between controller 60 of the arm 40, 240, 249 and a load connector position control system for x-y-z control of the position of a/the load connector of the crane.

In an embodiment, it is envisaged that there is an automated operation of the crane in unison with arm 40, 240,249 when the root 8*a* is advanced from the receiving position to the pre-mounting position and/or when moving from pre-mounting position to mounting position.

In an embodiment, there is an automated x-y control of crane in order to align the longitudinal axis of the blade with the mounting axis, e.g. based on angle sensing by sensor(s) on the arm 40 or sensor(s) on arm segment 240 and/or stage 249.

In an embodiment, as shown, there is a gimbal mounting of blade root coupler so as to allow for (limited) rotation of blade root, e.g. to avoid overloading the arm 40, 240 due to blade motion.

In an embodiment, provision is made for a camera that is directed at the blade root, e.g. at the protruding bolts 10, the imagen being displayed for a human operator, and/or used for an automated image processing, e.g. so as to avoid collision and/or to issue warning signal(s).

As discussed, one or more tag lines may be used to orient and/or stabilize lifting tool 20 and/or the blade, primarily in a horizontal plane.

In an embodiment, a so-called High Wind Boom Lock or other arrangement may be provided to stabilize the load connector relative to crane boom.

The wind turbine coupler 31, 231 may be self-climbing on the tower, but is preferably mounted to the tower top using a crane, e.g. the same crane as the one handling the blade in the operations described herein.

In an embodiment, the device 30, 230 is provided with an integrated power supply, e.g. a battery, hydraulic power units(s), etc.

In an embodiment, the device 30, 230 is provided with a fire extinguishing system.

In an embodiment, the device 30, 230 is provided with an auxiliary crane.

FIGS. 11*a*-*d* illustrate schematically an alternative version of the wind turbine coupler 331 of the blade motion synchronization and positioning device 330 wherein the wind turbine coupler 331 is shown to be mounted to the nacelle 3 of the wind turbine.

This mounting to the nacelle makes, as preferred, use of one or more hard points 301 on the nacelle. Here two hard points, e.g. also used for hoisting the nacelle by means of a crane, are shown on top of the nacelle with which the wind turbine coupler 331 is configured to releasably couple.

The hard points 331 are part of the structure of the nacelle 3, e.g. on the exterior thereof, e.g. on the top and/or on one or more sides of the nacelle, possible (yet less preferred) on the bottom of the nacelle.

In embodiments, one or more hard points are present on the horizontal axis hub 4 of the wind turbine. Such one or more hard points can be used in combination with one or more hard points on the nacelle for mounting the device 330. Yet, only using hard points on the nacelle, e.g. two on top and one or more on a side of the nacelle, is preferred.

Although two hard points 301 are shown here on the top of the nacelle 3 in embodiments there are three or more of these hard points 301 available on the exterior of the nacelle.

In embodiments, the hard points 301 are not only present on the top of the nacelle but also or just on the sides and/or back of the nacelle.

In embodiments, one or more hard points 301 are present on the horizontal axis hub of the nacelle.

In practical versions of this alternative embodiment of the wind turbine coupler 331 it is preferred to have just or at least three hard points to couple with 301.

Figure 11D:
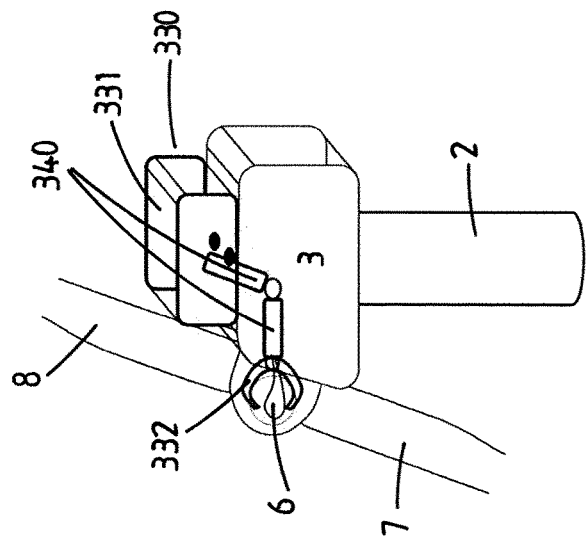
Figures 11B, 11C:
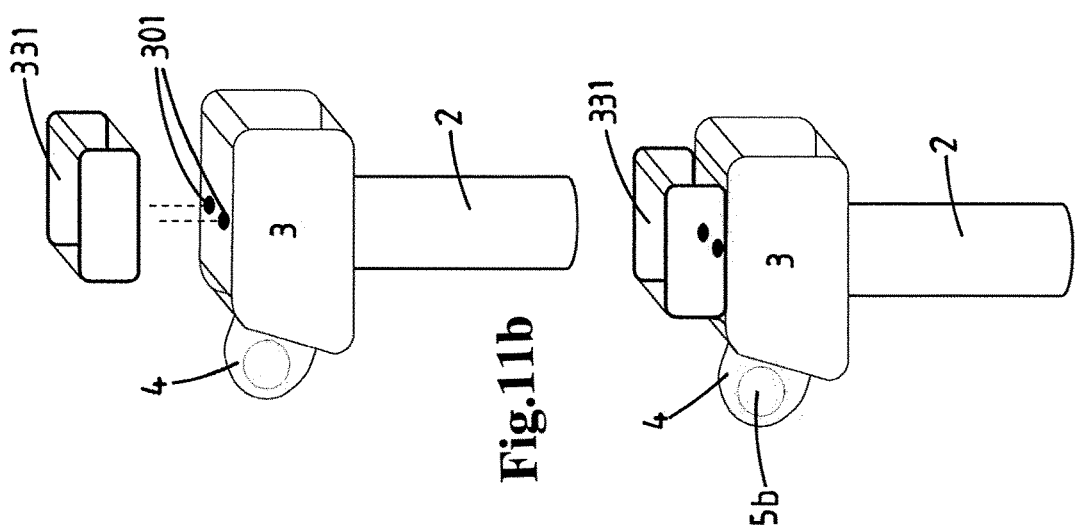
Figure 11A:
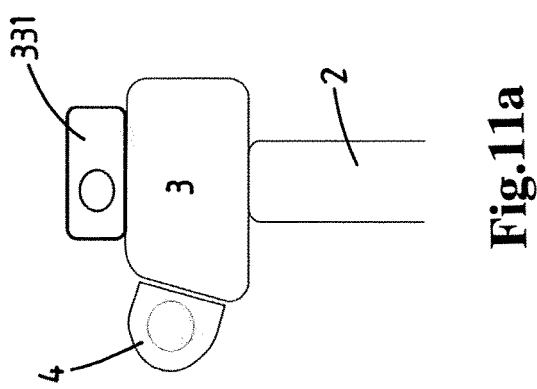

FIG. 11*d* also shows schematically the presence of the motion arm 340 and the blade coupler 332 to handle blade 6.

The FIGS. 12*a-f* show schematically several alternative embodiments of the blade motion synchronization and positioning device wherein the wind turbine coupler is coupled to the nacelle in various positions and forms.

Figures 12A, 12B:
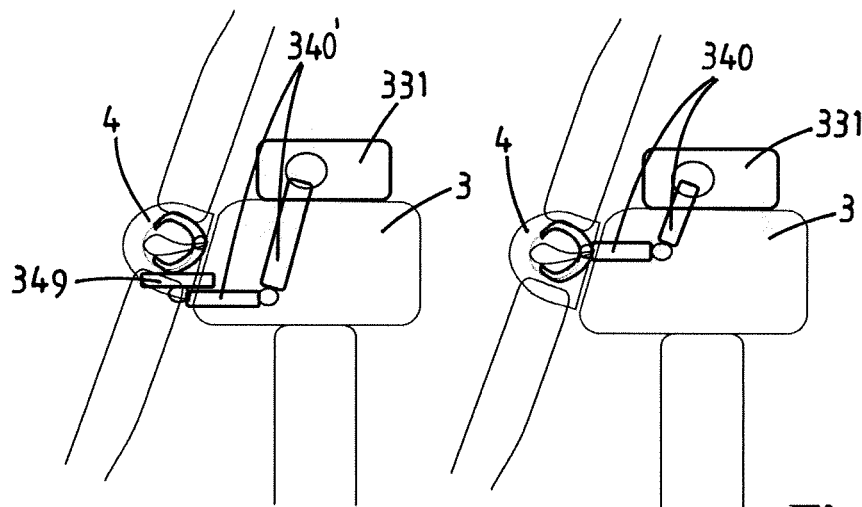

In FIGS. 12*a* and 12*b* the wind turbine coupler 331 is the same as in FIG. 11*d* but here two different embodiments of the motion arm and blade coupler are illustrated wherein the motion arm 340' in FIG. 12*a* is also shown to comprise a motion stage 349 similar to the earlier described motion stages used in previous embodiments.

FIGS. 12*a* and 12*b* illustrate the integration of the motion 349 stage and demonstrates that in all embodiments shown in FIGS. 11-14 the motion arm(s) could comprise such a or a similar motion stage but are left out to limit the number of figures.

Figures 12C, 12D:
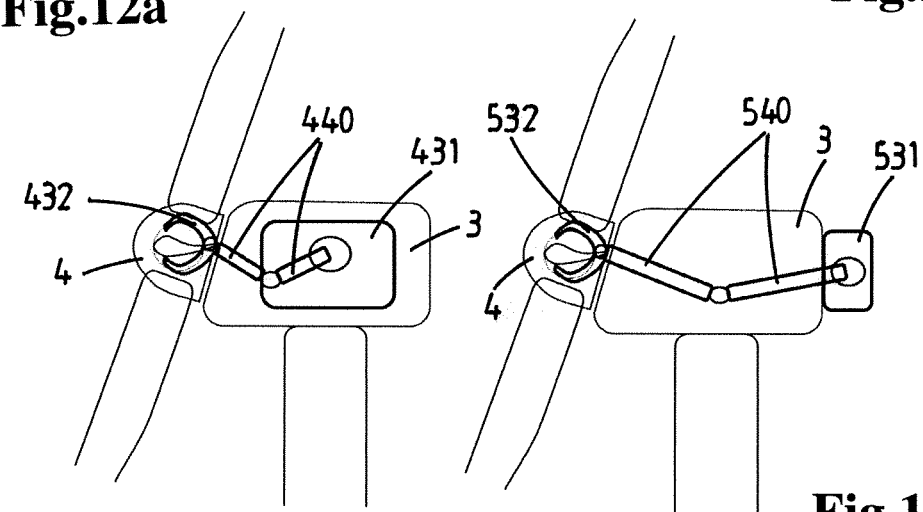

FIG. 12*c* shows an embodiment of the nacelle mounted wind turbine coupler 431 wherein the turbine coupler 431 is mounted only to the side of the nacelle 3. The blade motion synchronization and positioning device here also comprising a motion arm 440 and blade coupler 432.

Although not shown, the wind turbine coupler 431 is preferably configured to be coupled to hard points on or within the nacelle 3 and/or on horizontal axis hub 4.

As described earlier, in embodiments the motion arm 440 also comprises a motion stage not shown.

FIG. 12*d* shows an embodiment of the nacelle mounted wind turbine coupler 431, wherein the turbine coupler 531 is mounted to the back of the nacelle 3. The blade motion synchronization and positioning device here also comprising a motion arm 540 and blade coupler 532.

Although not shown, the wind turbine coupler 531 is understood to be configured to be coupled to hard points on or within the nacelle 3 and/or horizontal axis hub 4.

As described earlier, in embodiments the motion arm 540 also comprises a motion stage although not shown here.

Figures 12E, 12F:
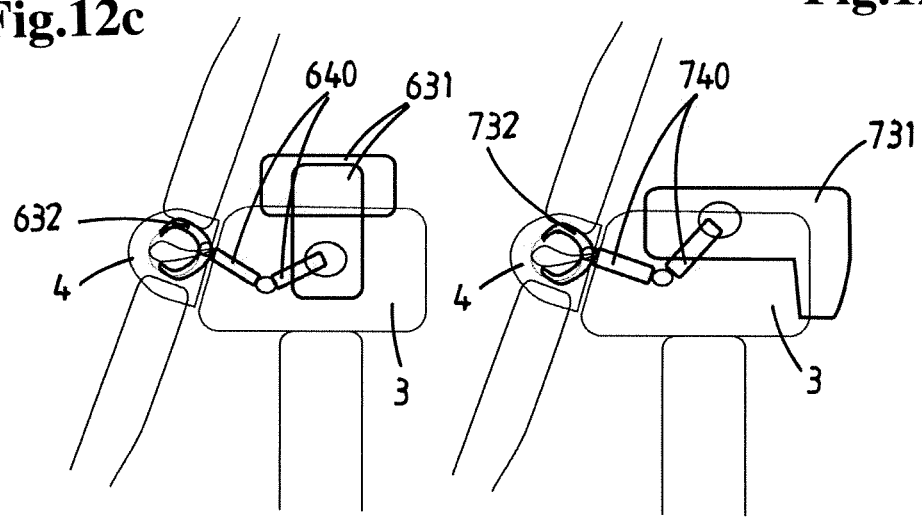

FIG. 12*e* shows an embodiment of the nacelle mounted wind turbine coupler 631, wherein the turbine coupler 631 is mounted to the top and the side of the nacelle 3. The blade motion synchronization and positioning device here also comprising a motion arm 440 and blade coupler 432.

Although not shown, the wind turbine coupler 631 is understood to be configured to be coupled to hard points on or within the nacelle 3.

As described earlier, in embodiments the motion arm 640 also comprises a motion stage although not shown here.

FIG. 12*f* shows an embodiment of the nacelle mounted wind turbine coupler 731, wherein the turbine coupler 731 is mounted to the top, side and back of the nacelle 3. The blade motion synchronization and positioning device here also comprising a motion arm 740 and blade coupler 732.

Although not shown, the wind turbine coupler 731 is understood to be configured to be coupled to hard points on or within the nacelle 3.

As described earlier, in embodiments the motion arm 740 also comprises a motion stage although not shown here.

FIGS. 13*a*, 13*b* and 13*c* show schematically an alternative embodiment of the wind turbine coupler 831, more or less similar to the embodiment shown in FIG. 12*e* being coupled to the top and side of the nacelle 3. The blade motion synchronization and positioning device here also comprising a motion arm 840 and blade coupler 832.

As an example of the earlier described alternative availability, the hard points 801 are here schematically illustrated on and/or accessible through the top as well as the side of the nacelle 3.

As described earlier, in embodiments the motion arm 840 also comprises a motion stage although not shown here.

In an embodiment the blade motion synchronization and positioning device comprises a second motion arm identical to motion arm 840 and a blade coupler 832 attached to the opposite side of the wind turbine coupler 831.

The FIGS. 14*a-d* show schematically several instances of an alternative embodiment of the blade motion synchronization and positioning device, wherein the wind turbine coupler is only coupled to the horizontal axis hub 4 of the wind turbine.

FIG. 14*a* illustrates that the wind turbine coupler 931 of the blade motion synchronization and positioning device is coupled to the nose of the horizontal axis hub 4 of the wind turbine. Here is assumed that one or more hard points is/are available, not shown, at the nose of the horizontal axis hub 4 on and/or within the horizontal axis hub 4.

The blade motion synchronization and positioning device here also comprising a motion arm 940 and 932. As described earlier, in embodiments the motion arm 940 also comprises a motion stage although not shown here.

FIGS. 14*b*, 14*c* and 14*d* illustrate the wind turbine coupler 1031 being coupled to one or more of the blade mounting structures 5*a*, 5*b* or 5*c*. For example, the coupler is embodied to couple to such structure without impairing the mounting of a blade 6,7,8 to the same blade mounting structure. For example, the coupler clamps onto an external periphery of the structure 5*a*,5*b*, 5*c*, without blocking the mounting of a blade to the same structure. The blade motion synchronization and positioning device here also comprising a motion arm 1040 and blade coupler 1032.

In alternative embodiments that are not shown here, the wind turbine coupler 1031 illustrated in FIGS. 14*b*, 14*c*, and 14*d* is configured to be coupled to one or more hard points of the nose of the hub, e.g. located in between the blade mounting structures 5*a*, 5*b* and 5*c*.

FIGS. 14*b*, 14*c* and 14*d* illustrate that the motion arm 1040 and blade coupler 1032 can be configured to operate in several stances with regards to the horizontal axis hub 4 and nacelle 3. To avoid collision with the nacelle 3 however, the orientations of FIGS. 14*c* and 14*d* are preferred.

FIG. 15 shows schematically an embodiment of the blade motion synchronization and positioning device wherein a secondary motion 1140' arm is utilized, one arm mounted to the wind turbine and a secondary motion arm 1140' mounted to the blade lifting tool 1120.

FIG. 15 illustrates the blade coupler(s) being replaced by interlocking motion arm couplers 1170 and 1171 attached to the motion arm 1140 and secondary motion arm 1140' respectively. The first motion arm 1140 being attached to the wind turbine coupler 1131 which is here coupled to the top and side of the nacelle and the secondary motion arm 1140' as part of the blade lifting tool 1120 which is connected to the load connector of the crane, not shown.

After the interlocking motion arm couplers 1170 and 1171 have coupled, the motion arm 1140 and secondary motion arm 1140' can be operated in unison to achieve a similar result as by the method for a singular motion arm.

This embodiment could have several advantages some of which are, but are not limited to; not having to couple to the blade and thus less chance of damage, an increased reaching distance, increased flexibility, etc.

For example, the embodiment of FIG. 15 allows for a method for installation of a rotor blade in horizontal orientation to the hub of a horizontal axis offshore wind turbine that is located offshore, wherein the offshore wind turbine comprises:
   a foundation,
   a tower mounted on the foundation and having a tower top,
   a nacelle on the tower top, the nacelle being provided with a horizontal axis hub having multiple blade mounting structures, each configured for securing thereto a rotor blade,
wherein use is made of a vessel that is provided with a crane having a load connector suspended from one or more winch driven cables of the crane,
wherein a blade lifting tool that is attached to the load connector is engaged with a rotor blade in horizontal orientation, which rotor blade has a blade body with a blade root, a blade tip, a length, and a rotor blade mass, wherein the blade root has an exterior and is configured to be secured in a mounting position of the blade root to a blade mounting structure of the hub of the offshore wind turbine by means of one or more fasteners,
wherein the crane is operated to lift the rotor blade whilst remaining in horizontal orientation to a height that is substantially level with a blade mounting structure of the offshore wind turbine,
wherein use is made of a blade motion synchronization and positioning system, which system comprises:
   a wind turbine motion arm device, which device comprises:
   a wind turbine coupler 1131, that is configured to releasably couple the device to the wind turbine, here nacelle 4,
   a first motion arm coupler 1170,
   a first motion arm 1140 between the wind turbine coupler and the first motion arm coupler 1170,
   a first controllable motion arm actuator assembly comprising one or more actuators associated with the first motion arm and a controller, the assembly being configured to provide controlled motion of the first motion arm,
   a rotor blade motion arm device, which device comprises:
      a blade coupler 1120, e.g. integrated with the blade lifting tool, that is configured to releasably couple the device to the rotor blade,
      a second motion arm coupler 1171,
      a second motion arm 1140' between the blade coupler and the second motion arm coupler,
      a second controllable motion arm actuator assembly comprising one or more actuators associated with the second motion arm and a controller, the assembly being configured to provide controlled motion of the second motion arm,
wherein the tower top is subject to sea state and/or wind induced tower top motion in at least one direction in a horizontal plane, wherein the method comprises:
   coupling the wind turbine motion arm device to the wind turbine and coupling the rotor blade motion arm device to the rotor blade,
   suspending the rotor blade from the crane, substantially level with a blade mounting structure of the hub of the wind turbine,
   operating the first motion arm and/or the second motion arm so as to bring and maintain the first and second motion arm couplers 1170, 1171 in a pre-interlocking position and in a synchronized motion, so that the motion arm couplers are substantially stationary relative to one another in said pre-interlocking position,
   operating the first and/or second controllable motion arm actuator assembly to displace the first and second motion arm couplers 1170, 1171 from said pre-interlocking position towards one another and then interlocking the first and second motion arm couplers,
   with the first and second motion arm couplers 1170, 1171 being interlocked-operating the first and/or second controllable motion arm actuator assembly so as to gradually bring, and then maintain, the rotor blade, e.g. the blade root, in a horizontal motion that is synchronized with the tower top motion, and
   possibly simultaneously with said synchronization, operating the first and/or second controllable motion arm actuator assembly to displace the blade root of the coupled blade towards the blade mounting structure into a pre-mounting position,
   operating the first and/or second controllable motion arm actuator assembly to perform a mounting motion wherein the blade root is moved from the pre-mounting position into the mounting position, and keeping the blade root in the mounting position during fastening of the blade root to the mounting structure by one or more fasteners.

FIG. 16 shows schematically the implementation of a hub connection member 17 and pitch bearing 14 integrated with a wind turbine blade 8 before it has been mounted to the wind turbine.

This implementation is beneficial for the installation and/or alignment of the blade root 8a to the blade mounting structures 5a,5b and 5c.

The invention claimed is:

1. A method for installation of a rotor blade in horizontal orientation to the hub of a horizontal axis offshore wind turbine that is located offshore, wherein the offshore wind turbine comprises:
   a foundation;
   a tower mounted on the foundation and having a tower top; and
   a nacelle on the tower top, the nacelle being provided with a horizontal axis hub having multiple blade mounting structures, each configured for securing thereto a rotor blade,
   wherein use is made of a vessel that is provided with a crane having a load connector suspended from one or more winch driven cables of the crane,
   wherein a blade lifting tool that is attached to the load connector is engaged with a rotor blade in horizontal orientation, the rotor blade having a blade body with a blade root, a blade tip, a length, and a rotor blade mass, wherein the blade root has an exterior and is configured to be secured in a mounting position of the blade root to a blade mounting structure of the hub of the offshore wind turbine by means of one or more fasteners, wherein the crane is operated to lift the rotor blade whilst remaining in horizontal orientation to a height that is substantially level with the blade mounting structure of the offshore wind turbine,
wherein use is made of a blade motion synchronization and positioning device, the blade synchronization and positioning device comprising:
a wind turbine coupler, configured to releasably couple the blade motion synchronization and positioning device to the wind turbine;
a blade coupler;
a motion arm between the wind turbine coupler and the blade coupler; and
a controllable motion arm actuator assembly comprising one or more actuators associated with the motion arm and a controller, the controllable motion arm actuator assembly being configured to provide controlled motion of the motion arm,
wherein the wind turbine coupler is coupled to the wind turbine,
wherein the tower top is subject to sea state and/or wind induced tower top motion in at least one direction in a horizontal plane,
wherein the method comprises:
operating the controllable motion arm actuator assembly to bring and maintain the blade coupler in a motion compensated receiving position thereof, wherein the motion arm is operated to compensate for the tower top motion;
coupling the blade coupler in said receiving position thereof to the rotor blade, that is suspended from the crane, substantially level with a blade mounting structure of the hub of the wind turbine;
with the blade coupler being coupled to the blade, operating the controllable motion arm actuator assembly so as to gradually bring, and then maintain, the coupled blade, in a horizontal motion that is synchronized with the tower top motion;
operating the controllable motion arm actuator assembly to displace the blade root of the coupled blade into a pre-mounting position that is closer to the blade mounting structure than the receiving position; and
operating the controllable motion arm actuator assembly to perform a mounting motion, wherein the blade root is moved from the pre-mounting position into the mounting position, and keeping the blade root in the mounting position during fastening of the blade root to the mounting structure by one or more fasteners.

2. The method according to claim 1, wherein the motion arm is configured to provide for motion solely in two non-parallel horizontal directions.

3. The method according to claim 1, wherein the motion arm is an articulated motion arm having multiple interconnected arm segments including an inner arm segment that is connected to the wind turbine coupler and an outer arm segment that carries the blade coupler, wherein the arm segments are connected to one another via a Z-axis hinge.

4. The method according to claim 1, wherein the motion arm comprises a controllably actuated parallelogram mechanism configured to provide motion in vertical direction by operating of the parallelogram mechanism.

5. The method according to claim 1, wherein an outer arm segment of the motion arm comprises an X-Y or X-Y-θ stage on which the blade coupler is mounted, the X-Y or X-Y-θ stage being configured to provide independently controllable motion of the blade coupler in an X direction and a Y direction and possibly also of a rotation around a Z-axis.

6. The method according to claim 1, wherein the blade coupler is carried on the motion arm, so as to be pivotal relative to the motion arm at least about a Z-axis swivel pivot, allowing for sway motion of rotor blade suspended from the crane about the Z-axis swivel pivot when coupled to the blade coupler.

7. The method according to claim 1, wherein the blade coupler is an openable gripper that is configured to grip about the blade root, the gripper having a gripper base connected to the motion arm, and the gripper having one or more pivotal gripper jaws, wherein the method comprises opening the gripper so that the coupling of the blade root comprises resting the blade root on the gripper base and then closing the gripper by actuation of the one or more pivotal gripper jaws.

8. The method according to claim 1, wherein the motion arm is dimensioned and configured such that the motion arm is able to move the blade coupler around from one side of the nacelle to an opposite side of the nacelle.

9. The method according to claim 1, wherein the synchronization is effected prior to displacing the blade root of the coupled blade into the pre-mounting position.

10. The method according to claim 1, wherein the synchronization is effected at least in part simultaneously with displacing the blade root of the coupled blade into the pre-mounting position.

11. The method according to claim 1, wherein the method comprises a verification step that is performed with the blade root in the pre-mounting position and prior to initiating the mounting motion, which verification step comprises verification of the synchronization and/or alignment of the blade root with the mounting structure.

12. The method according to claim 1, wherein the crane has a boom, and wherein the crane is provided with a load connector active position control system that is configured and operated to actively control the position of the load connector in at least one horizontal direction relative to the boom, wherein the method comprises operating the load connector active position control system in synchronicity with the blade coupler.

13. The method according to claim 1, wherein the blade lifting tool comprises a frame that is attached to the load connector of the crane, and wherein the blade lifting tool comprises a blade holding assembly that is mobile mounted relative to the frame, and wherein the blade lifting tool comprises a controllable motion actuator device between the frame and the blade holding assembly.

14. The method according to claim 13, wherein the method comprises operating the controllable motion actuator device to move the blade holding assembly relative to the frame in synchronicity with the blade coupler when coupled to the blade.

15. The method according to claim 13, wherein the blade lifting tool comprises an active COG balancing system with a counterweight that is mobile mounted relative to the frame and with the controlled motion actuator device being arranged between the frame and the counterweight, wherein the method comprises moving the counterweight relative to the frame in order to cause a common centre of gravity of the blade mass and the lifting tool to remain stable in a horizontal plane when the blade holding assembly and the blade held thereby are moved relative to the frame.

16. The method according to claim 1, wherein use is made of one or more sensors that measure the distance and/or position and/or angular orientation of the blade root relative to the mounting structure, said one or more sensors being linked to the controller of the controllable motion arm actuator assembly.

17. The method according to claim 1, wherein the method comprises the use of a control unit for control of the motion arm, said control unit being operated by a human operator present in the nacelle.

18. The method according to claim 1, wherein, after completion of fastening of the rotor blade to the mounting structure of the hub of the offshore wind turbine, the blade coupler is released from the blade root and the motion arm is then operated to move into a retracted configuration wherein clearance is provided for the installed rotor blade during a rotation of the hub that is done so as to bring another one of the mounting structures into position for the installation of another rotor blade to the offshore wind turbine.

19. The method according to claim 1, wherein the method comprises an emergency distancing routine, wherein the motion arm is operated to cause a rapid distancing of blade root away from nacelle.

20. A system for use in the installation of a rotor blade in horizontal orientation to a mounting structure of a hub of a horizontal axis offshore wind turbine that is located offshore, according to the method of claim 1, wherein the system comprises:
the blade motion synchronization and positioning device, the blade motion synchronization and positioning device comprising:
the wind turbine coupler, configured to releasably couple the device to the wind turbine;
the blade coupler;
the motion arm between the wind turbine coupler and the blade coupler; and
the controllable motion arm actuator assembly comprising the one or more actuators associated with the motion arm and the controller, the controllable motion arm actuator assembly being configured to provided controlled motion of the motion arm;
the vessel provided with the crane having the load connector suspended from the one or more winch driven cables of the crane,
the blade lifting tool that is attached or attachable to the load connector and configured to be engaged with the rotor blade in horizontal orientation thereof, the rotor blade having the blade body with the blade root, the blade tip, the length, and the rotor blade mass, wherein the blade root has the exterior and is configured to be secured in the mounting position of the blade root to the blade mounting structure of the hub of the offshore wind turbine by means of the one or more fasteners,
wherein the crane is configured to lift the rotor blade whilst remaining in horizontal orientation to the height that is substantially level with the blade mounting structure of the offshore wind turbine.

21. The system according to claim 20, wherein the crane has a boom, and wherein the crane is provided with a load connector active position control system that is configured and operated to actively control the position of the load connector in at least one horizontal direction relative to the boom, wherein the system is configured to operate the load connector active position control system in synchronicity with the blade coupler when coupled to the blade.

22. The system according to claim 20, wherein the blade lifting tool comprises a frame that is attached to the load connector of the crane, and wherein the blade lifting tool comprises a blade holding assembly that is mobile mounted relative to the frame, and wherein the blade lifting tool comprises a controllable motion actuator device between frame and blade holding assembly.

23. The system according to claim 22, wherein the system is configured to operate the controllable motion actuator device so as to move the blade holding assembly relative to the frame in synchronicity with the blade coupler when coupled to the blade.

24. The system according to claim 22, wherein the blade lifting tool comprises an active COG balancing system with a counterweight that is mobile mounted relative to frame and with the controlled motion actuator device being arranged between the frame and the counterweight, wherein the system is configured to move the counterweight relative to the frame in order to cause a common centre of gravity of the blade mass and the lifting tool to remain stable in a horizontal plane when the blade holding assembly and the blade held thereby are moved relative to the frame.

25. The system according to claim 20, wherein the system comprises one or more sensors that are configured to measure the distance and/or position and/or angular orientation of the blade coupler and/or the blade root relative to the mounting structure, said one or more sensors being linked to the controller of the controllable motion arm actuator assembly and/or, if present, to the load connector active position control system and/or, if present, to the controllable motion actuator device that moves the blade holding assembly relative to the frame.

26. The system according to claim 20, wherein the system is configured to perform an emergency distancing routine, wherein the motion arm is operated to cause a rapid distancing of the blade root away from nacelle.

* * * * *